United States Patent
Kanamarlapudi et al.

(10) Patent No.: US 12,483,929 B2
(45) Date of Patent: Nov. 25, 2025

(54) RADIO LINK CONTROL (RLC) STATUS REPORTING

(71) Applicant: QUALCOMM Incorporated, San Diego, CA (US)

(72) Inventors: Sitaramanjaneyulu Kanamarlapudi, San Diego, CA (US); Leena Zacharias, San Jose, CA (US); Arnaud Meylan, San Diego, CA (US); Prasad Reddy Kadiri, San Diego, CA (US); Vishal Dalmiya, San Diego, CA (US); Vaishakh Rao, San Diego, CA (US); Ashwin Madhur Comandur, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 18/331,488

(22) Filed: Jun. 8, 2023

(65) Prior Publication Data
US 2023/0319627 A1    Oct. 5, 2023

Related U.S. Application Data

(62) Division of application No. 17/301,549, filed on Apr. 6, 2021, now Pat. No. 11,722,927.
(Continued)

(51) Int. Cl.
*H04W 28/04*        (2009.01)
*H04L 1/1829*       (2023.01)
(Continued)

(52) U.S. Cl.
CPC ........... *H04W 28/04* (2013.01); *H04L 1/1848* (2013.01); *H04L 1/1864* (2013.01);
(Continued)

(58) Field of Classification Search
CPC . H04W 28/04; H04W 28/0278; H04W 72/23; H04L 1/1848; H04L 1/1864;
(Continued)

(56) References Cited

U.S. PATENT DOCUMENTS 11,856,450 B2 * 12/2023 Damnjanovic ....... H04W 28/04
2006/0013257 A1    1/2006 Vayanos et al.
(Continued)

OTHER PUBLICATIONS

Motorola Mobility, et al., "Correcton to RLC AM Test Cases", 3GPP TSG-RAN5 Meeting #81, R5-187106, Spokane, USA, Nov. 12-16, 2018, Nov. 2, 2018, 49 pages.
(Continued)

*Primary Examiner* — Afshawn M Towfighi
(74) *Attorney, Agent, or Firm* — Harrity & Harrity, LLP

(57) ABSTRACT

Wireless communication systems and methods related to Radio Link Control (RLC) status reporting are provided. A wireless communication device receives one or more radio link control (RLC) packet data units (PDUs) of a sequence of RLC PDUs. The wireless communication device determines missing RLC data PDUs in the sequence of RLC PDUs based on the received one or more RLC PDUs. The wireless communication device receives a first uplink (UL) grant. The wireless communication device transmits a first RLC status report including an indication of a first subset of the missing RLC PDUs less than all the missing RLC PDUs, the indication of the first subset of missing PDUs being based on a size of the first UL grant. The wireless communication device modifies a RLC status prohibit timer based on the transmitted first RLC status report indicating less than all the missing RLC PDUs.

11 Claims, 10 Drawing Sheets

Related U.S. Application Data

(60) Provisional application No. 63/032,861, filed on Jun. 1, 2020, provisional application No. 63/006,686, filed on Apr. 7, 2020.

(51) Int. Cl.
  *H04L 1/1867* (2023.01)
  *H04W 28/02* (2009.01)
  *H04W 72/23* (2023.01)
  *H04L 1/00* (2006.01)
  *H04L 1/1607* (2023.01)

(52) U.S. Cl.
  CPC ....... *H04L 1/1896* (2013.01); *H04W 28/0278* (2013.01); *H04W 72/23* (2023.01); *H04L 1/0061* (2013.01); *H04L 1/1642* (2013.01)

(58) Field of Classification Search
  CPC ... H04L 1/1896; H04L 1/0061; H04L 1/1642; H04L 1/1671
  See application file for complete search history.

(56) References Cited

U.S. PATENT DOCUMENTS

| | | |
|---|---|---|
| 2010/0105334 A1 | 4/2010 | Terry et al. |
| 2012/0176910 A1 | 7/2012 | Cui |
| 2013/0028096 A1 | 1/2013 | Cheng et al. |
| 2013/0044726 A1 | 2/2013 | Shrivastava et al. |
| 2015/0215987 A1* | 7/2015 | Kim ................. H04W 76/20 370/329 |
| 2016/0127939 A1 | 5/2016 | Bathwal et al. |
| 2016/0315736 A1 | 10/2016 | Dwarakanath et al. |
| 2018/0115392 A1 | 4/2018 | Yang et al. |
| 2018/0262950 A1 | 9/2018 | Malkamaki et al. |
| 2018/0317114 A1 | 11/2018 | Kim et al. |
| 2019/0239097 A1 | 8/2019 | Meylan et al. |
| 2019/0253921 A1* | 8/2019 | Shin ..................... H04L 1/12 |
| 2021/0314810 A1 | 10/2021 | Kanamarlapudi et al. |
| 2024/0114388 A1* | 4/2024 | Damnjanovic ....... H04W 80/02 |

OTHER PUBLICATIONS

International Preliminary Report on Patentability—PCT/US2021/026080—The International Bureau of WIPO—Geneva, Switzerland—Oct. 20, 2022.

International Search Report and Written Opinion—PCT/US2021/026080—ISA/EPO—Oct. 11, 2021.

QUALCOMM: "Clarification to the Handling of Large RLC Status Reports", 3GPP TSG-RAN WG2 #62, 3GPP Draft, R2-082489, 3rd Generation Partnership Project (3GPP), Mobile Competence Centre, 650, Route Des Lucioles, F-06921 Sophia-Antipolis Cedex, France, vol. RAN WG2, No. Kansas City, USA, May 5, 2008-May 9, 2008, pp. 1-4, Apr. 29, 2008, Apr. 29, 2008 (Apr. 29, 2008), XP050140173, [retrieved on Apr. 29, 2008] the whole document.

* cited by examiner

RADIO LINK CONTROL (RLC) STATUS REPORTING

CROSS REFERENCE TO RELATED APPLICATIONS

The present application is a divisional of U.S. patent application Ser. No. 17/301,549, filed Apr. 6, 2021, which claims priority to and the benefit of U.S. Provisional Patent Application No. 63/006,686, filed Apr. 7, 2020, and U.S. Provisional Patent Application No. 63/032,861, filed Jun. 1, 2020, each of which is hereby incorporated by reference in its entirety as if fully set forth below and for all applicable purposes.

TECHNICAL FIELD

This application relates to wireless communication systems, and more particularly to Radio Link Control (RLC) status reporting in a wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Among the communication layers employed by 5G NR is the Radio Link Control (RLC) layer, which is responsible for packet segmentation and assembly, in-sequence delivery of data units to higher layers (e.g., a Packet Data Convergence Protocol (PDCP) layer), and error control procedures. The RLC layer may operate in Acknowledged Mode (AM), Unacknowledged Mode (UM), and/or Transparent Mode (TM).

In RLC AM, a device may transmit data as a sequence of protocol data units (PDUs)—some of which may not be successfully delivered—to a receiving device. As part of the error control procedures employed by AM, a receiving device may send a RLC status PDU to the transmitting device. The RLC status PDU may include an acknowledgement (ACK) indicating which PDUs were successfully received, along with a negative acknowledgement (NACK) indicating which PDUs failed to be received. The transmitting device, after processing the status PDU, may then retransmit the data PDUs for which delivery failed, as indicated by the NACK.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a wireless communication device, includes receiving one or more radio link control (RLC) packet data units (PDUs) of a sequence of RLC PDUs; determining missing RLC data PDUs in the sequence of RLC PDUs based on the received one or more RLC PDUs; receiving a first uplink (UL) grant; transmitting a first RLC status report including an indication of a first subset of the missing RLC PDUs less than all the missing RLC PDUs, the indication of the first subset of missing PDUs being based on a size of the first UL grant; and modifying a RLC status prohibit timer based on the transmitted first RLC status report indicating less than all the missing RLC PDUs.

In an additional aspect of the disclosure, a method of wireless communication performed by a wireless communication device, includes receiving one or more radio link control (RLC) packet data units (PDUs) of a sequence of RLC PDUs; determining one or more missing data segments in the sequence of RLC PDUs based on the received one or more RLC PDUs; receiving an uplink (UL) grant; and transmitting a RLC status report indicating that a data range in the sequence of RLC PDUs includes missing data based on the one or more missing data segments, the indication of the data range being based on a size of the UL grant.

In an additional aspect of the disclosure, a wireless communication device includes a memory; a transceiver; and at least one processor coupled to the memory and, wherein the at least one processor is configured to receive, via the transceiver, one or more radio link control (RLC) packet data units (PDUs) of a sequence of RLC PDUs; determine missing RLC PDUs in the sequence of RLC PDUs based on the received one or more RLC PDUs; receive, via the transceiver, a first uplink (UL) grant; transmit, via the transceiver, a first RLC status report including an indication of a first subset of the missing RLC PDUs less than all the missing RLC PDUs, the indication of the first subset of missing PDUs being based on a size of the first UL grant; and modify a RLC status prohibit timer based on the transmitted first RLC status report indicating less than all the missing RLC PDUs.

In an additional aspect of the disclosure, a wireless communication device includes a memory; a transceiver; and at least one processor coupled to the memory and, wherein the at least one processor is configured to receive, via the transceiver, one or more radio link control (RLC) packet data units (PDUs) of a sequence of RLC PDUs; determining one or more missing data segments in the sequence of RLC PDUs based on the received one or more RLC PDUs; receiving an uplink (UL) grant; and transmit, via the transceiver, a RLC status report indicating that a data range in the sequence of RLC PDUs includes missing data based on the one or more missing data segments, the indication of the data range being based on a size of the UL grant.

In an additional aspect of the disclosure, a non-transitory computer-readable medium having program code recorded thereon, the program code includes code for causing a wireless communication device to receive one or more radio link control (RLC) packet data units (PDUs) of a sequence of RLC PDUs; code for causing the wireless communication device to determine missing RLC data PDUs in the sequence of RLC PDUs based on the received one or more RLC PDUs; code for causing the wireless communication device to receive a first uplink (UL) grant; code for causing the wireless communication device to transmit a first RLC status report including an indication of a first subset of the missing RLC PDUs less than all the missing RLC PDUs, the indication of the first subset of missing PDUs being based on a size of the first UL grant; and code for causing the wireless communication device to modify a RLC status prohibit timer based on the transmitted first RLC status report indicating less than all the missing RLC PDUs.

In an additional aspect of the disclosure, a non-transitory computer-readable medium having program code recorded thereon, the program code includes code for causing a wireless communication device to receive one or more radio link control (RLC) packet data units (PDUs) of a sequence of RLC PDUs; code for causing the wireless communication device to determine one or more missing data segments in the sequence of RLC PDUs based on the received one or more RLC PDUs; code for causing the wireless communication device to receive an uplink (UL) grant; and code for causing the wireless communication device to transmit a RLC status report indicating that a data range in the sequence of RLC PDUs includes missing data based on the one or more missing data segments, the indication of the data range being based on a size of the UL grant.

In an additional aspect of the disclosure, a wireless communication device includes means for receiving one or more radio link control (RLC) packet data units (PDUs) of a sequence of RLC PDUs; means for determining missing RLC data PDUs in the sequence of RLC PDUs based on the received one or more RLC PDUs; means for receiving a first uplink (UL) grant; means for transmitting a first RLC status report including an indication of a first subset of the missing RLC PDUs less than all the missing RLC PDUs, the indication of the first subset of missing PDUs being based on a size of the first UL grant; and means for modifying a RLC status prohibit timer based on the transmitted first RLC status report indicating less than all the missing RLC PDUs.

In an additional aspect of the disclosure, a wireless communication device includes means for receiving one or more radio link control (RLC) packet data units (PDUs) of a sequence of RLC PDUs; means for determining one or more missing data segments in the sequence of RLC PDUs based on the received one or more RLC PDUs; means for receiving an uplink (UL) grant; and means for transmitting a RLC status report indicating that a data range in the sequence of RLC PDUs includes missing data based on the one or more missing data segments, the indication of the data range being based on a size of the UL grant.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
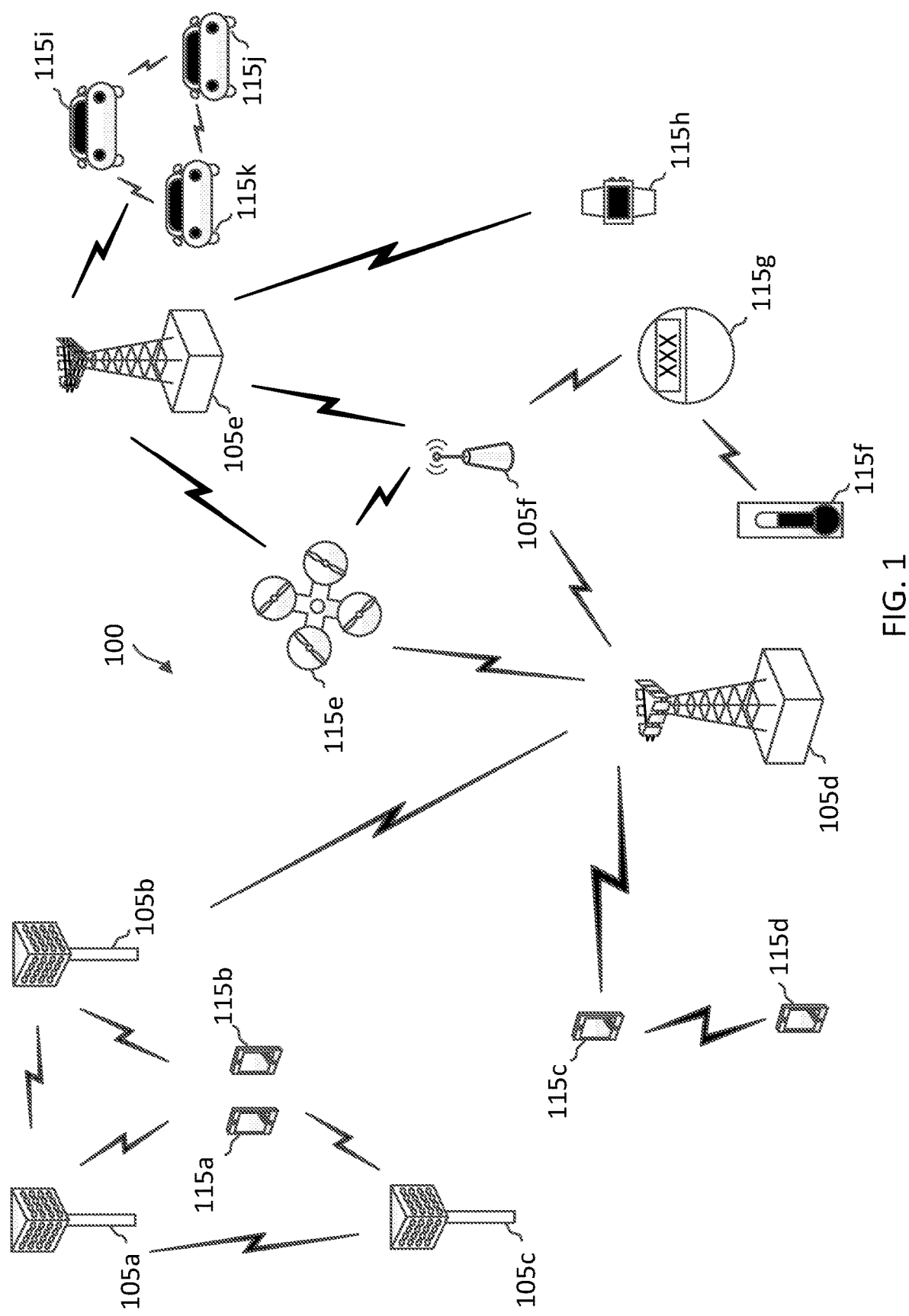
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In LTE and 5G wireless protocol stacks, the Radio Link Control (RLC) layer is a protocol layer that is between a Packet Data Convergence Protocol (PDCP) layer and a Media Access Control (MAC) layer. The RLC layer may provide segmentation and retransmission services to user service data and control data. Some examples of RLC layer functions may include link control, transfer of Protocol Data Units (PDUs) of an upper layer, recombination, segmentation, re-segmentation, and cascade, transfer of PDUs to the upper layer in order, Automatic Repeat Request (ARQ) error correction, repeatability detection, flow control, protocol error detection and repair, RLC reconstruction, etc. The functions of the RLC layer are implemented by an RLC entity, for example, at a BS and/or a UE. Each RLC entity may be configured by Radio Resource Control (RRC) to perform data transfer in a Transparent Mode (TM), an Unacknowledged Mode (UM), and/or an Acknowledged Mode (AM). The ARQ retransmission in the AM is achieved by an RLC receiving entity transmitting a status report to an RLC transmitting entity and the RLC transmitting entity determining which PDUs have been acknowledged to be received by the RLC receiving entity and which PDUs or segments of a PDU need to be retransmitted according to an Acknowledgement Sequence Number (ACK SN) and a Negative acknowledgement Sequence Number (NACK SN), so as to ensure reliability of data transmission. In an example, the RLC transmit entity may be located at a BS and the RLC receiving entity may be located at a UE. In another example, the RLC transmit entity may be located at a UE and the RLC receiving entity may be located at a BS. In a further example, a BS may have a RLC transmit entity communicating with a RLC receive entity at UE, and may also have a RLC receiving entity communicating with a RLC transmit entity at the UE.

When operating in RLC AM, a RLC transmitting entity may transmit RLC data to a RLC receiving entity as a sequence of protocol data units (PDUs). An RLC PDU is part of an RLC service data unit (SDU) (complete or partial) which is transmitted at any given opportunity. Each RLC SDU may include an SN field indicating the sequence number of the corresponding RLC SDU. For RLC AM, the SN is incremented by one for every RLC SDU. The SNs may allow the RLC transmit entity and the RLC receiving entity to track the delivery status of each PDU and may assist the RLC receiving entity in performing packet reassembly (e.g., when packet segmentation is performed by the transmitting device's RLC entity). For instance, the RLC transmitting entity may maintain and track transmitted PDUs using a transmission window and the RLC receiving entity may maintain and track received PDUs using a receiving window. The RLC receiving entity may prepare and transmit an RLC status PDU including information regarding which PDUs were received and which were not.

For instance, the RLC status PDU may include an acknowledgement sequence number (ACK_SN) field and may further include one or more non-acknowledgement sequence number (NACK_SN) fields. The NACK_SN fields indicate the SNs of data PDUs within the receiving window that were not successfully delivered to the RLC receiving entity. The ACK_SN field indicates the SN of the next not-received RLC PDU which has not been marked as lost in the NACK_SN fields and also indicates the upper edge of the RLC receive window. The upper edge of the RLC receive window may correspond to the end of the last successfully received PDU at the receiving device. For instance, if the last successfully received PDU has a SN of 10, the ACK_SN field may indicate a SN value of 11. In some instances, the RLC receive window may also be referred to as an RLC AM reassembly window or an RLC AM reordering window.

According to 3GPP Release 15, a RLC status PDU is expected to represent the complete status of the RLC receive window. However, in some power-limited, bandwidth-limited, or grant-limited conditions (as with narrowband NR or IOT devices), the network may be unable to accommodate a status PDU large enough to transmit the required number of NACK_SN fields. In other words, the network may not be able to allocate a sufficient amount of bandwidth for the RLC receiving entity to transmit a complete status of the RLC receive window.

The present application describes mechanisms for optimizing RLC status reporting under power-limited, bandwidth-limited, and/or grant-limited conditions. For example, a BS may transmit a sequence of RLC data PDUs to a UE. The UE may receive one or more RLC data PDUs of the sequence of RLC data PDUs. The UE may store and track the delivery statuses of the one or more received RLC data PDUs using a RLC receive window. The BS may transmit a UL grant to the UE. The UL grant may indicate radio resources allocated for the UE. Upon receiving the UL grant, the UE may determine whether the UL grant has allocated a sufficient amount of resources for a full or complete RLC status report transmission. A full or complete RLC status report may refer to a RLC status report including NACK indications for all RLC data PDUs in the RLC receive window that the UE fails to receive.

In some aspects, if the UE determines that the UL grant size is insufficient for providing a full RLC status report (including a full or complete status of the RLC receive window), the UE may include as many NACK indications of missing RLC data PDUs as will be accommodated by the UL grant size, but may modify the operations of a RLC status prohibit timer. A RLC status prohibit timer is used to prohibit the transmission of a RLC status report while the RLC status prohibit timer is ongoing. In other words, a UE may not be allowed to transmit a RLC status report until the RLC status prohibit timer elapses. In one example, as part of modifying the RLC status prohibit timer, the UE may refrain from starting a RLC status prohibit timer after transmitting a partial or incomplete RLC status report. In another example, as part of modifying the RLC status prohibit timer, the UE may start the RLC status prohibit timer with a reduced timer value after transmitting a partial or incomplete RLC status report. For instance, the UE may select a first RLC status prohibit timer value between the first RLC status prohibit timer value and a second RLC status prohibit timer value, where the first RLC status prohibit timer value is less than the second RLC status prohibit timer value and the second RLC status prohibit timer value is used when a full RLC status report is sent.

In some aspects, the UE may transmit a partial or incomplete RLC status report along with a buffer status report (BSR) indicating a size for transmitting a full RLC status report. For example, the BSR may be a medium access control control element (MAC CE) and the UE may transmit a MAC transport block (TB) including the partial or incomplete RLC status report and the BSR. In some aspects, when the UE receives a next new UL grant from the BS, the UE may reattempt to transmit another RLC status report including a complete status of the RLC receive window. In other words, the UE may indicate NACKs for some of the missing RLC data PDUs that were included in the previous partial RLC status report again in a subsequent RLC status report. In some aspects, the UE may remain in a RLC status report triggered state after transmitting a partial or complete RLC status report and may exit the RLC status report triggered state after transmitting a full or complete RLC status report.

In some aspects, if the UE determines that the UL grant size is insufficient for providing a full RLC status report (including a full or complete status of the RLC receive window), the UE may transmit a RLC status report indicating that a data range in the sequence of RLC data PDUs includes missing data. In one example, when the UE determines that the quantity or density of missing RLC data PDUs in a range of RLC data PDUs (within a certain SN range) in the sequence is high (e.g., higher than what can be accommodated by the UL grant size or a certain threshold), the UE may indicate the range in the RLC status report instead of indicating each missing RLC data PDUs individually so that a full RLC status report may be transmitted using the UL grant. In another example, when the UE determines that there are multiple missing byte segments in a certain RLC data PDU of the sequence of RLC data PDUs, the UE may discard the entire RLC data PDU and indicate the RLC data PDU as missing instead of indicating each missing byte segment individually so that a full RLC status report may be transmitted using the UL grant.

Aspects of the present disclosure can provide several benefits for RLC status reporting in bandwidth-limited, grant-limited, and/or power-limited conditions. For example, modifying a RLC status prohibit timer when a full or complete RLC status report cannot be sent allows the UE to continue to reattempt to send a full or complete RLC status report upon receiving a new UL grant. Reporting missing RLC data PDUs with a high density within a SN range in the form of a data range can reduce RLC status report size allowing a full RLC status report to be sent even when a grant size is small. While reporting a data range including missing RLC data PDUs can cause the BS to retransmit RLC data PDUs that were already successfully received by the UE, this approach can reduce the number of reattempts in sending a full RLC status report and allow the UE to receive the missing RLC data PDUs. Similarly, discarding an entire RLC data PDU with multiple missing byte segments and reporting the RLC data PDU as missing can reduce RLC status report size allowing a full RLC status report to be sent even when a grant size is small. While the present disclosure is described in the context of optimizing RLC status reporting in LTE or 5G, the present disclosure can be applied to any suitable wireless communication networks that utilize ARQ mechanisms in a bandwidth-limited, power-limited, and/or grant-limited conditions.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

Figure 4:
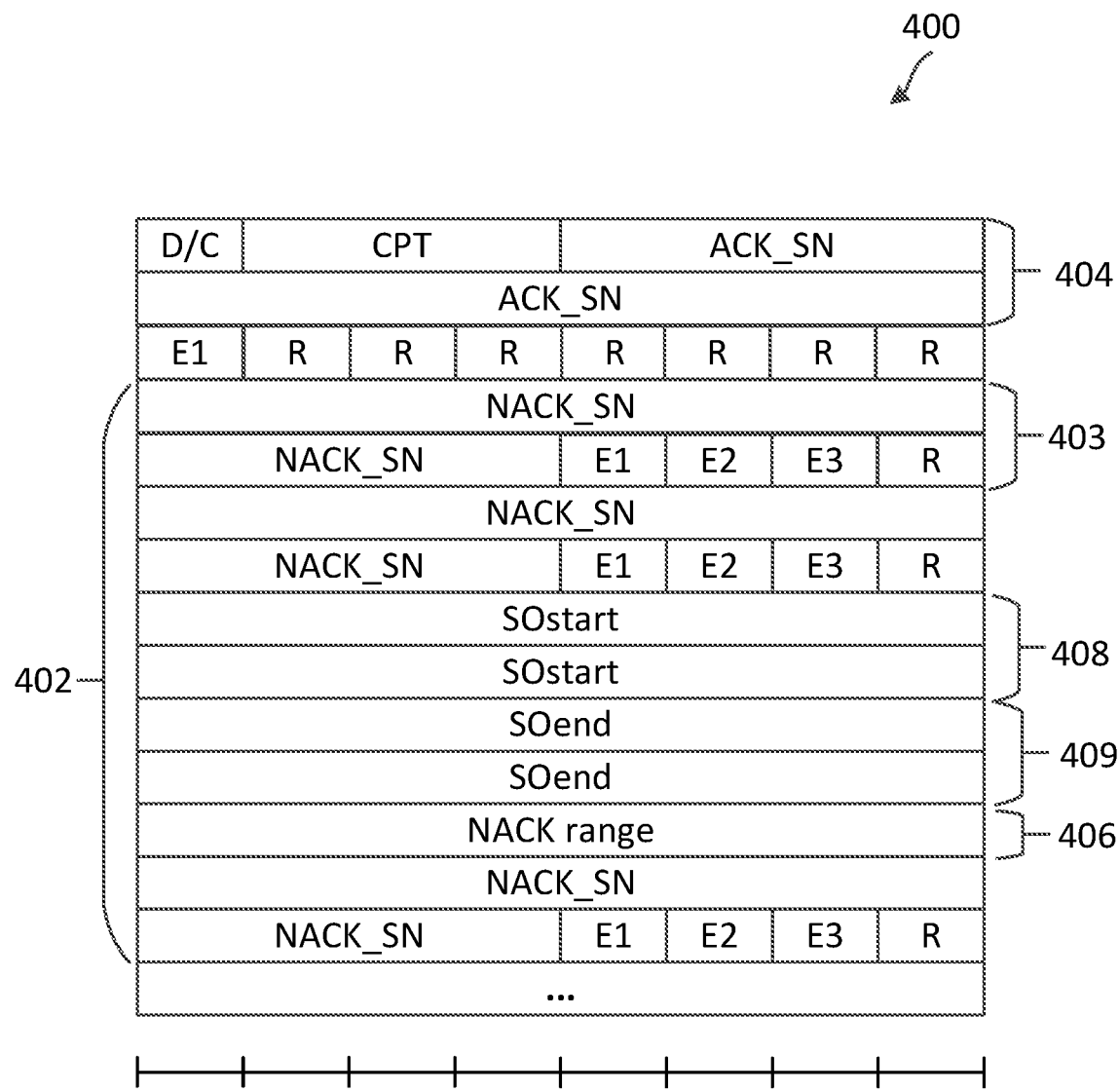
FIG. 4 illustrates an exemplary structure of a RLC status report according to some aspects of the present disclosure.

In some aspects, the network 100 may implement a radio interface protocol including a PDCP layer, a RLC layer, a MAC layer, and a physical (PHY) layer. The PDCP, RLC, and MAC layers may be referred to as Layer 2 (L2). The PHY layer may be referred to as Layer 1 (L1). At a transmitter side (e.g., a BS 105 or a UE 115), a PDCP layer may receive data packets from an upper layer (e.g., transmission control protocol/Internet protocol (TCP/IP) layer) and transport the data packets via an RLC layer, a MAC layer, and a PHY layer for over-the-air (OTA) transmission. At a receiver side, data packets are received OTA via a PHY layer, a MAC layer, an RLC layer, and a PDCP layer, which delivers the data packets to an upper layer. The RLC layer at the transmitter may perform segmentation and the RLC layer. The receiver may perform reassembly and in-sequence delivery of data units to higher layers, and error control procedures (e.g., ARQ). The RLC layer may operate in AM, UM, and/or TM. For example, in AM, a BS 105 may transmit data as a sequence of PDUs to a UE 115, some of which may not be successfully delivered. The BS 105 may assign each RLC PDU, which may also be referred to as RLC data PDU, in the sequence with a SN in a sequential order. As part of the error control procedures employed by the network 100, the UE 115 may send a RLC status PDU to the BS 105. The RLC status PDU may include an ACK indicating which PDUs were successfully received, along with a NACK indicating which PDUs failed to be received. Each NACK or ACK indication may include a SN identifying a missing RLC PDU (that the UE 115 failed to receive) or a successfully received RL CPDU. Portions of the RLC status PDU may be configured as illustrated in FIG. 4 as will be discussed more fully below. The BS 105, after processing the status PDU, may then retransmit the data PDUs for which delivery failed, as indicated by the NACK.

In some aspects, the BS 105 may transmit a UL grant to the UE 115 for transmitting a RLC status report. The UE 115 may maintain a RLC receive window to track the status of each RLC PDU received from the BS 105. The UE 115 may provide the BS 105 with a RLC status report regarding RLC PDUs in the RLC receive window. The RLC status report may include a complete status of the RLC receive window, for example, with indications for RLC PDUs that the UE 115 fails to receive. For instance, the RLC status report may be in the form of a RLC status PDU. The RLC status PDU may include a NACK indications or NACL fields for each missing RLC PDU. For example, if there are eight missing RLC PDUs in the RLC receive window, the UE 115 may include eight NACK indications or eight NACK fields in the RLC status report. As such, the RLC status PDU size may increase as the quantity of missing RLC PDUs in the RLC receive window increases. Thus, in some instances, the UL grant may not grant a sufficient amount of radio resources for the UE 115 to transmit an entire RLC status report with a full status of the RLC receive window. The limited UL grant size may occur, for example, when the network 100 operates over a narrowband (e.g., with a small frequency bandwidth), when the network 100 has a high traffic load, or when the channel condition is poor. According to embodiments of the present disclosure, the UE 115 may perform various optimizations in RLC status report generation and/or RLC status reporting when receiving a UL grant with an insufficient allocation size for a full RLC status report.

Figure 2:
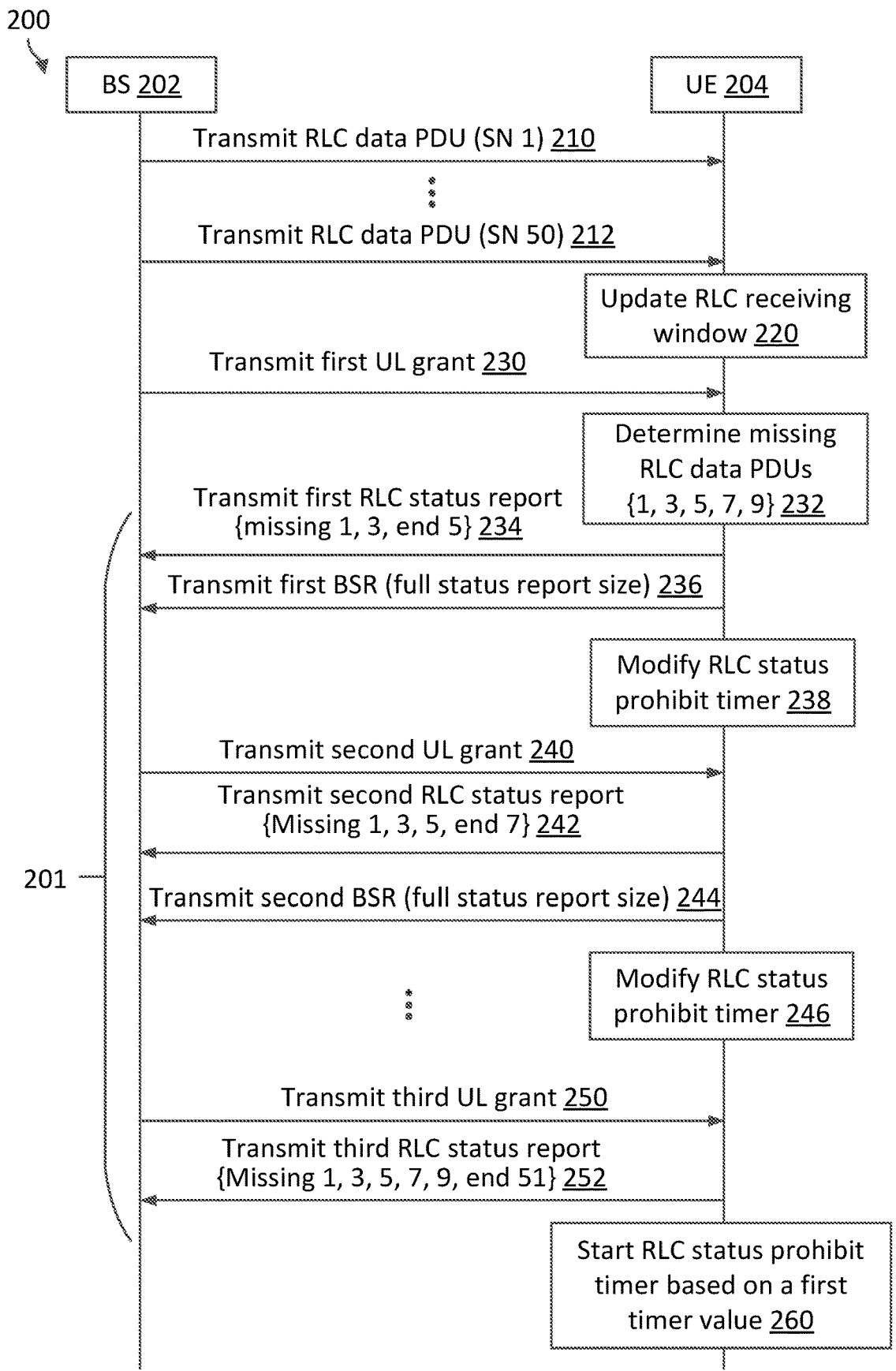
FIG. 2 is a signaling diagram illustrating a Radio Link Control (RLC) status reporting method according to some aspects of the present disclosure.
Figure 3:
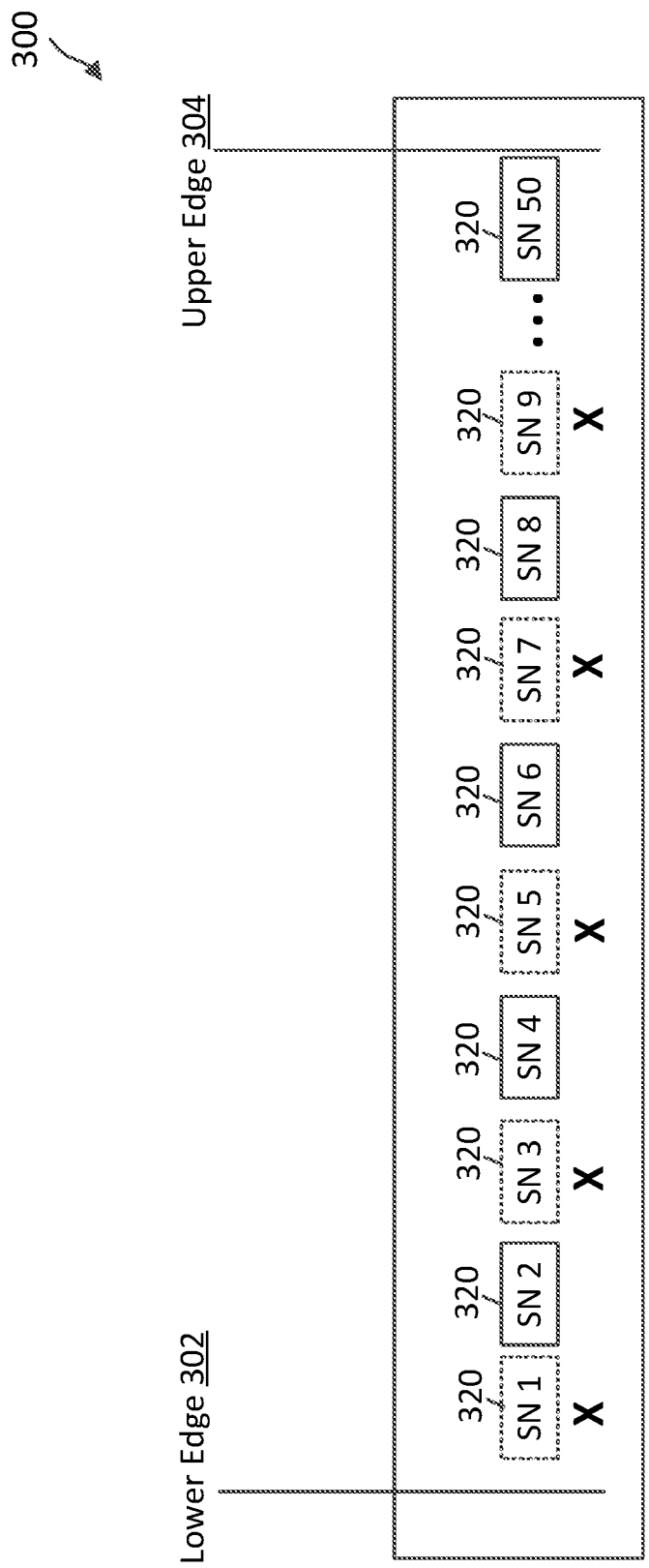
FIG. 3 illustrates a RLC receive window according to some aspects of the present disclosure.

FIG. 2 is discussed in relation to FIG. 3 to illustrate mechanisms for optimizing RLC status reporting. FIG. 2 is a signaling diagram illustrating a RLC status reporting method 200 according to some aspects of the present disclosure. The method 200 may be implemented between a BS 202 and a UE 204. The BS 202 may correspond to a BS 105 in the network 100, and the UE may correspond to a UE 115 in the network 100. Although the method 200 illustrates the BS 202 in communications with one UE 204, it should be understood that in other examples the BS 202 may communicate with any suitable number of UEs 204 (e.g., about 2, 3, 4, 5, 6 or more). As illustrated, the method 200 includes a number of enumerated actions, but embodiments of the method 200 may include additional actions before, after, and in between the enumerated actions. In some embodiments, one or more of the enumerated actions may be omitted or performed in a different order.

At actions 210 to 212, the BS 202 transmits a sequence of RLC data PDUs to the UE 204. Each RLC data PDU may carry data from an upper layer (e.g., a PDCP layer). In some examples, the data can be Transmission Control Protocol/Internet protocol (TCP/IP data). The BS 202 may assign each RLC data PDU in the sequence with a SN in a sequential order. For instance, the sequence may include a RLC data PDU with a SN of X, followed by a RLC data PDU with a SN of X+1, followed by a RLC data PDU with a SN of X+2, and so on, where X is an integer. In the illustrated example of FIG. 2, the sequence may have SNs from 1 to N, where N can be any suitable positive integer.

At action 210, the BS 202 transmits a RLC data PDU with a SN value of 1. Subsequently, the BS 202 may transmit a RLC data PDU with a SN value of 2, followed by a RLC data PDU with a SN value of 3 and a RLC data PDU with a SN value of 4, and so on in a sequential order.

For instance, at action 212, the BS 202 transmits up to a RLC data PDU with a SN value of 50.

At action 220, the UE 204 maintain a RLC receive window (e.g., RLC receive window 300 shown in FIG. 3) to track RLC data PDUs received from the BS 202 as will be discussed more fully below in relation to FIG. 3.

At action 230, the BS 202 transmits a first UL grant for the UE 204 to transmit a RLC status report. The UL grant may indicate an allocated resource and/or a transmission parameter (e.g., a modulation coding scheme (MCS)). The resource may be a time-frequency resource, for example, including one or more frequency subcarriers in frequency and one more symbols in time that the UE may use to transmit the RLC status report. In some instance, the resource may be in the form of a number of RBs. The number of bits that can be carried by the RB may depend on the size of the allocated RB(s) (e.g., number of REs) and the MCS. That is, the size of a TB is determined from the number RBs and the MCS.

A RLC status report can be triggered by the BS 202 and/or by the UE 204. In some aspects, the BS 202 may provide the UE 204 with the UL grant for transmitting a RLC status report after the BS 202 triggered a RLC status report transmission from the UE 204. For example, the BS 202 may set a poll bit in a previously transmitted RLC data PDU to indicate the trigger. In some other aspects, the BS 202 may provide the UE 204 with the UL grant based on a BSR received from the UE 204. For instance, a RLC status report transmission may be triggered at the UE 204. The trigger at the receiving UE 204 may be based on a timer and/or a trigger from a MAC layer of the UE 204. Additionally or alternatively, the UE 204 may be configured to transmit a RLC status report whenever the UE 204 detects a missing RLC data PDU (in a sequence of RLC data PDUs based on the SNs in the received RLC data PDUs). Upon detecting the trigger, the UE 204 may transmit a BSR to the BS 202 to request for a UL grant.

At action 232, the UE 204 determines missing RLC data PDUs in the sequence of RLC data PDUs. As an example, the UE 204 successfully received RLC data PDUs SN 2, SN4, SN6, SN 8, and SN 10 to SN 50, but fails to receive RLC data PDUs with SN 1, SN 3, SN 5, SN 7, and SN 9. The UE 204 may fail to receive the RLC data PDUs with SN 1, SN 3, SN 5, SN 7, and SN 9, due to various reasons, for example, a low signal-to-noise (SNR) channel condition. The UE 204 may track the successfully received RLC data PDUs and the missing RLC data PDUs as shown in FIG. 3.

FIG. 3 illustrates a RLC receive window 300 according to some aspects of the present disclosure. The RLC receive window 300 may be implemented by a UE such as the UEs 115 and/or 204. In some aspects, the RLC receive window 300 may correspond to a portion of a memory (e.g., the memory 704 and 804) at the UE. In an example, the UE 204 may store RLC data PDUs 320 received from the BS 202 in the RLC receive window 300, for example, in a sequential order according to corresponding SNs. The UE 204 may track RLC data PDUs 320 that are successfully received from the BS 202 as well as RLC data PDUs 320 that the UE 204 fails to receive based on the SNs of the RLC data PDUs. Referring to the example discussed above at action 232, the UE 204 may store the successfully received RLC data PDUs 320 (e.g., RLC data PDUs SN 2, SN4, SN6, SN 8, and SN 10 to SN 50) in the RLC receive window and track the missing RLC data PDUs with SN 1, SN 3, SN 5, SN 7, and SN 9 in the sequence of RLC data PDUs from SN 1 to SN 50. The UE 204 may track the received RLC data PDUs and the missing RLC data PDUs in the RLC receive window 300, for example, using a linked list, where each element in the link list may include a pointer to a current RLC data PDU in the sequence and a pointer to a next RLC data PDUs in the sequence, or any other suitable forms. The successfully received RLC data PDUs are shown by the solid-lined boxes. The missing RLC data PDU are shown by the dotted-lined boxes with a cross mark "X" below.

The RLC receive window 300 may include a lower edge 302 and an upper edge 304. The lower edge 302 marks the RLC data PDU 320 with a lowest SN (e.g., a minimum SN value) that is not completely received by the UE 204. The upper edge 304 marks the RLC data PDU 320 with a highest SN (e.g., a maximum SN value) that is not completely received by the UE 204. In the illustrated example of FIG. 3, the lowest SN RLC data PDU 320 that is not completely received is the RLC data PDU SN 1, and the highest SN RLC data PDU 320 that is not completely received is the RLC data PDU SN 51. In some aspects, a RLC status PDU may include a full or complete status of the RLC receive window between the lower edge 302 and the upper edge 304. Accordingly, in the illustrated example of FIG. 3, a RLC status report for the RLC receive window 300 may include NACK indications for RLC data PDUs SN 1, SN 3, SN 5, SN 7, and SN 9.

Returning to FIG. 2, at action 234, the UE 204 transmits a first RLC status report to the BS 202 indicating a status of the RLC receive window 300. The first RLC status report may be transmitted in the form of a RLC status PDU as will be discussed more fully below in relation to FIG. 4. Depending on the size of the first UL grant, the UE 204 may or may not be able to include a complete RLC receiving status in the first RLC status report. The size of a UL grant refers to the number of information bits that may be transmitted in the allocated resource (using the assigned MCS). In the illustrated example of FIG. 2, the first UL grant may not allocate a sufficient amount of resource for the full RLC status report. Accordingly, the UE 204 may truncate the full RLC status report, for example, to include NACK indications for a subset of the missing RLC data PDUs instead of all the missing RLC data PDUs SN 1, SN 3, SN 5, SN 7, and SN 9. For example, the first UL grant has a size that allows for NACK indications for RLC data PDU SN 1 an RLC data PDU SN 3, but not for RLC data PDU SN 5, RLC data PDU SN 7, and RLC data PDU SN 9. Thus, the UE 204 may include NACK indications for RLC data PDUs SN 1 and SN 3 and an indication for a next expected PDU SN, which may be SN 5 since the UE 204 can indicate statuses up to RLC data PDU SN 4. The RLC status PDU is shown as {missing 1, 3, end 5} in FIG. 2.

At action 236, after transmitting the first RLC status report, the UE 204 transmits a first BSR to the BS 202 to request for another UL grant. Since the UE 204 was unable to transmit the full RLC status report at action 234, the UE 204 may indicate the size of a full RLC status report in the first BSR. The full RLC status report size may indicate a number of bytes required to report all the missing RLC data PDUs SN 1, SN 3, SN 5, SN 7, and SN 9 in a single RLC status PDU. While FIG. 2 illustrates the UE 204 transmitting the first BSR separately from the first RLC status report, in some other examples, the UE 204 may transmit the first BSR along with the first RLC status report. For example, the UE 204 may generate a MAC layer transport block (TB) including the RLC status report and the first BSR and transmit the TB in a single transmission, where the first BSR is a MAC layer packet (e.g., a MAC CE).

At action 238, the UE 204 modifies a RLC status prohibit timer based on the first RLC status report transmitted at action 236 not being a full RLC status report providing a complete status of the RLC receive window 300. A RLC status prohibit timer is used to prohibit any RLC status report transmissions while the RLC status prohibit timer is active (e.g., where a countdown is in progress). In other words, no RLC status report transmission is allowed until the elapse of the RLC status prohibit timer. In some aspects, as part of modifying the RLC status prohibit timer, the UE 204 may refrain from starting the RLC status prohibit timer based on the first RLC status report transmitted at action 236 not being a full RLC status report providing a complete status of the RLC receive window 300. In some other aspects, as part of modifying the RLC status prohibit timer, the UE 204 may start the RLC status prohibit timer with a reduced timer value based on the first RLC status report transmitted at action 236 not being a full RLC status report providing a complete status of the RLC receive window 300. For instance, the UE 204 may set the RLC status prohibit timer value to a first timer value if a full RLC status report is sent and may set the RLC status prohibit timer to a second value smaller than first timer value if a partial RLC status report is sent.

At action 240, the BS 202 transmits a second UL grant to the UE 204, for example, in response to the first BSR.

At action 242, upon receiving the second UL grant, the UE 204 transmits a second RLC status report to the BS 202 to indicate a status of the RLC receive window 300. Since the UE 204 was unable to transmit a full RLC status report using the previous first UL grant, the UE 204 may reattempt to transmit a full RLC status report (including previously reported NACKs) with the second UL grant. For instance, the second UL grant may allow for a larger size RLC status report than the first UL grant, but may not allow for a full RLC status report. Thus, the UE 204 may indicate a subset of the missing RLC data PDUs, for example, RLC data PDU SN 1, RLC data PDU SN 3, and RLC data PDU SN 5. The next expected PDU SN may be SN 7 since the UE 204 can indicate statuses up to RLC data PDU SN 6. The second RLC status PDU is shown as {missing 1, 3, 5, end 7} in FIG. 2.

In some aspects, if the UE 204 started the RLC status prohibit timer with the reduced timer value at action 238, the UE 204 may check that the RLC status prohibit timer has elapsed before transmitting the second RLC status report. Otherwise, the UE 204 may wait till the RLC status prohibit timer elapses and transmit another BSR to request for a UL grant for transmitting the second RLC status report.

At action 244, after transmitting the second RLC status report, the UE 204 transmits a second BSR to the BS 202 to request for another UL grant. Similar to the first BSR, the UE 204 may indicate the size of a full RLC status report in the second BSR. Similar to action 236, while FIG. 2 illustrates the UE 204 transmitting the second BSR separately from the second RLC status report, in some other examples, the UE 204 may transmit the second BSR and the second RLC status report in a single transmission.

At action 246, the UE 204 modifies a RLC status prohibit timer based on the second RLC status report transmitted at action 242 not being a full RLC status report providing a complete status of the RLC receive window 300, for example, by perform similar operations as in action 238.

At action 250, the BS 202 transmits a third UL grant to the UE 204, for example, in response to the second BSR.

At action 252, upon receiving the third UL grant, the UE 204 transmits a third RLC status report to the BS 202 to indicate a status of the RLC receive window 300. Since the UE 204 was unable to transmit a full RLC status report using the previous second UL grant, the UE 204 may reattempt to transmit a full RLC status report with the second UL grant. For instance, the third UL grant may allow for a full RLC status report to be sent. Thus, the UE 204 may indicate all the missing RLC data PDUs SN 1, SN 3, SN 5, SN 7, and SN 9 in the third RLC status report. The next expected PDU SN may be SN 51 since the UE 204 can indicate statuses up to RLC data PDU SN 50. The third RLC status PDU is shown as {missing 1, 3, 5, 7, 9, end 51} in FIG. 2.

In some aspects, similar to action 242, if the UE 204 started the RLC status prohibit timer with the reduced timer value at action 246, the UE 204 may check that the RLC status prohibit timer has elapsed before transmitting the third RLC status report. Otherwise, the UE 204 may wait till the RLC status prohibit timer elapses and transmit another BSR to request for a UL grant for transmitting the third RLC status report.

At action 260, after transmitting the third RLC status report indicating a complete status of the RLC receive window 300, the UE 204 starts a RLC status prohibit timer based on the first timer value. The UE 204 may refrain from transmitting another RLC status report before the expiration of the RLC status prohibit timer.

In some aspects, the UE 204 may maintain a RLC status report triggered state. For instance, upon detecting a RLC status report trigger (initiated by the BS 202 or by the UE 204), the UE 204 may set the RLC status report triggered state (e.g., to a value of 1). The UE 204 may transmit a RLC status report while the RLC status report triggered state is set. Conversely, the UE 204 may not transmit a RLC status report while the RLC status report triggered state is not set (e.g., having a value of 0), for example, even when the UE 204 is configured with a RLC status report timer for periodic reporting and the RLC status report timer elapsed. In the method 200, the UE 204 may not reset the RLC status report triggered state until a full RLC status report is sent. As such, the UE 204 may not reset the RLC status report triggered state after transmitting the first RLC status report at action 234 or the second RLC status report at action 244 based on the first and second RLC status report include a partial status of the RLC receive window 300, and not a complete status of the RLC receive window 300. In other words, the UE 204 may remain the RLC status report triggered state 201 after transmitting the first RLC status report at action 234 or the second RLC status report at action 244. However, the UE 204 may reset the RLC status report triggered state (e.g., to a value of 0) after transmitting the third RLC status report at action 252 since the third RLC status report include a complete status of the RLC receive window 300.

FIG. 4 illustrates an exemplary structure of a RLC status report 400 according to some aspects of the present disclosure. The RLC status report 400 may be implemented by a BS such as the BSs 105 and/or 202 and/or a UE such as the UEs 115 and/or 204 in a network such the network 100. For instance, a transmitter (e.g., a BS 105 or 202) may transmit a sequence of PDUs (e.g., RLC data PDUs 320) each associated with a SN to a receiver (e.g., a UE 115 or 204). In an example, the UE 204 of FIG. 2 may transmit the first RLC status report, the second RLC status report, and/or the third RLC status report in a format as shown in the RLC status report 400.

The structure of the RLC status report 400 may be similar to a RLC status PDU as described in the 3GPP document TS 38.322 Release 15, titled "3$^{rd}$ Generation Partnership Project; Technical Specification Group Radio Access Network; NR; Radio Link Control (RLC) protocol specification (Release 15)," version 15.5.0, March, 2019, which is incorporated herein by reference. As shown, the RLC status report 400 includes a NACK field 402 and an ACK_SN field 404. The NACK field 402 may comprise a list of sequence numbers (SNs) corresponding to RLC data PDUs in the sequence that were transmitted by the transmitter, but not received by the receiver. The first SN in the NACK field 402 may correspond to the first SN for which the RLC status report 400 provides status information. The ACK_SN field 404 may indicate an exclusive upper bound on the SNs for which the RLC status report 400 includes information. Any SNs in the range between the first SN in the NACK field 402 (inclusive) and ACK_SN field 404 (exclusive) which are not in the NACK field 402 are successfully received by the receiver. For example, in a RLC status report providing status information for SNs 1-50, where only the PDUs corresponding to SNs 1, 3, 5, 7, and 9 were not successfully received, the NACK field 402 may include a list of NACK SN indicators 403 indicating 1, 3, 5, 7, and 9 and the ACK_SN field 404 may include a value of 51 indicating a next expected SN 51 from the transmitter.

In an example, each NACK SN indicator 403 in the NACK field 402 may have a length of about 2 bytes and the ACK_SN field 404 may also have a length of about 2 bytes. As discussed above in relation to FIG. 2, if the UE 204 is granted with a small UL grant size that cannot accommodate a full RLC status report, the UE 204 may transmit a partial RLC status report including NACK indications for a subset of missing RLC data PDUs. The UE 204 may compute a maximum length (e.g., number of bytes) for NACK field 402 based on the UL grant size and determine a quantity of missing RLC data PDUs to be indicated based on the maximum length.

Additionally, the NACK field 402 may include a NACK range indicator 406. In an example, the NACK range indicator 406 may have a length of about 1 byte. For instance, the NACK field 402 may indicate a NACK SN indicator 403 a NACK range indicator 406 indicating a number of consecutively lost RLC data PDUs starting from and including the RLC data PDU indicated by the NACK SN indicator 403. For example, in a RLC status report providing status information for SNs 1-50, where PDUs corresponding to SNs 1 to 9 were not successfully received, the NACK field 402 may include a NACK_SN indicator 403 with a value of 1 indicating SN 1, a NACK range indicator 406 including a value of 9 (indicating 9 consecutively missed RLC data PDUs starting from and including RLC data PDU with SN 1), and the ACK_SN field 404 including a value of 51 indicating a next expected SN 51 from the transmitter.

In some aspects, when there is a large number of missing RLC data PDU within a range of RLC data PDUs in the sequence, the UE 204 may utilize the NACK range indicator 406 to indicate that there are missing RLC data PDU(s) in the range of RLC data PDUs instead of reporting each missing RLC data PDU in a separate NACK SN indication as will be discussed more fully below in relation to FIG. 5.

Additionally or alternatively, the NACK field 402 may include an SOstart indicator 408 and an SOend indicator 409. In an example, each of the SOstart indicator 408 and the SOend indicator 409 may have a length of about 2 bytes. The SOstart indicator 408 and the SOend indicator 409 may be utilized to indicate a data segment in a RLC data PDU is lost. For instance, if a portion of a RLC data PDU (e.g., the data PDUs 320) is not received successfully lost, the SOstart indicator 408 may indicate a beginning byte position of the lost data segment within the RLC data PDU, and the SOend indicator 409 may indicate an ending byte position of the lost data segment within the RLC data PDU. For example, in a RLC status report providing status information for SNs 1-50, where bytes in byte positions 5-10 within a PDU corresponding to SN 5 were not successfully received, the NACK field 402 may include a NACK_SN indicator 403 with a value of 5 indicating SN 5, a SOstart indicator 408 including a value of 5 indicating byte position 5, and the SOend indicator 409 including a value of 10 indicating byte position 10, and the ACK_SN field 404 including a value of 51 indicating a next expected SN 51 from the transmitter. In some aspects, the RLC status report 400 may indicate multiple missing data segments within a sequence of RLC data PDUs by using a NACK SN indicator 403, a SOstart indicator 408 an SOend indicator 409 for each missing data segment.

In some aspects, when there are many missing data segments in the RLC data PDU, the UE 204 may discard the RLC data PDU and requests for a retransmission of the RLC data PDU by indicating the SN of the RLC data PDU in the NACK field 402 as will be discussed more fully below in relation to FIG. 6.

Figure 5:
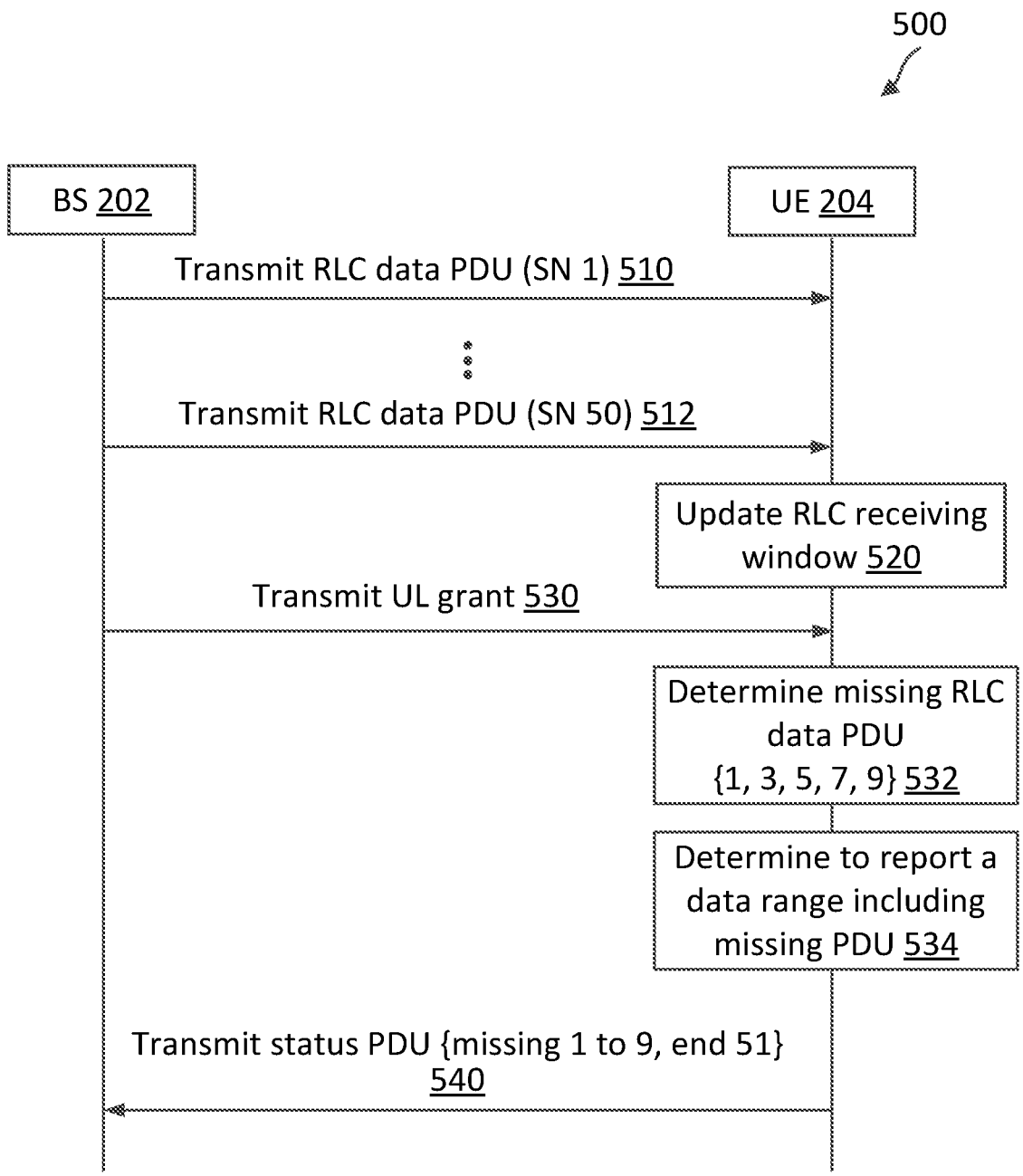
FIG. 5 is a signaling diagram illustrating a RLC status reporting method according to some aspects of the present disclosure.

FIG. 5 is a signaling diagram illustrating a RLC status reporting method 500 according to some aspects of the present disclosure. The method 500 may be implemented between the BS 202 and the UE 204. Although the method 500 illustrates the BS 202 in communications with one UE 204, it should be understood that in other examples the BS 202 may communicate with any suitable number of UEs 204 (e.g., about 2, 3, 4, 5, 6 or more). As illustrated, the method 500 includes a number of enumerated actions, but embodiments of the method 500 may include additional actions before, after, and in between the enumerated actions. In some embodiments, one or more of the enumerated actions may be omitted or performed in a different order.

The BS 202 and the UE 204 may implement the method 500 in addition to or alternative to the method 200. Generally speaking, the method 500 includes features similar to method 200 in many respects. For example, actions 510, 512, 520, 530, and 532 are similar to actions 210, 212, 220, 230, and 232, respectively. Accordingly, for sake of brevity, details of those actions will not be repeated here and may be referred to the corresponding descriptions above.

At action 534, the UE 204 determines to report a data range including the missing RLC data PDUs with SNs 1, 3, 5, 7, and, 9 instead of reporting each missing RLC data PDU individually. For instance, the UE 204 may determine that a quantity of the missing RLC data PDUs is high within the SN range from 1 to 9 and the UL grant size may not allow for transmitting a full RLC status report. Accordingly, the UE 204 may merge NACK SN as a range when the NACK density is high and report a contiguous set of missing RLC data PDUs while not all RLC data PDUs in the range are missing instead of reporting each missing RLC data PDU one-by-one.

At action 540, the UE 204 transmits a RLC status report to the BS 202 indicating that a data range in the sequence of RLC data PDUs includes missing RLC data PDUs. For instance, the UE 204 may generate RLC status report similar to the RLC status report 400. The RLC status report may include a NACK SN indicator 403 including a value of 1 indicating SN 1 and a NACK range indicator 406 including a value of 9 indicating 9 consecutively missing RLC data PDUs including the SN 1.

As can be observed from the method 500, the UE 204 may utilize about 10 bytes to report each missing RLC data PDU (SN 1, 3, 5, 7, 9) individually, while 3 bytes (e.g., 2 bytes for a NACK SN indication and one bytes for a NACK range indication) may be sufficient in reporting a data range including missing RLC data PDUs, providing a saving of about 7 bytes. However, there is a tradeoff between retransmissions (or bandwidth) and RLC status report size. For example, the indication of RLC data PDUs in the range of SNs 1 to 9 being missing may cause the BS 202 to retransmit RLC data PDUs with SN 2, 4, 6, 8 that were already successfully received by the UE 204.

While the method 500 is illustrated with one data range or SN range within the sequence of RLC data PDUs including missing RLC data PDUs, it should be understood that in other examples there may be multiple data range or SN range within a sequence of RLC data PDUs including missing RLC data PDUs.

Figure 6:
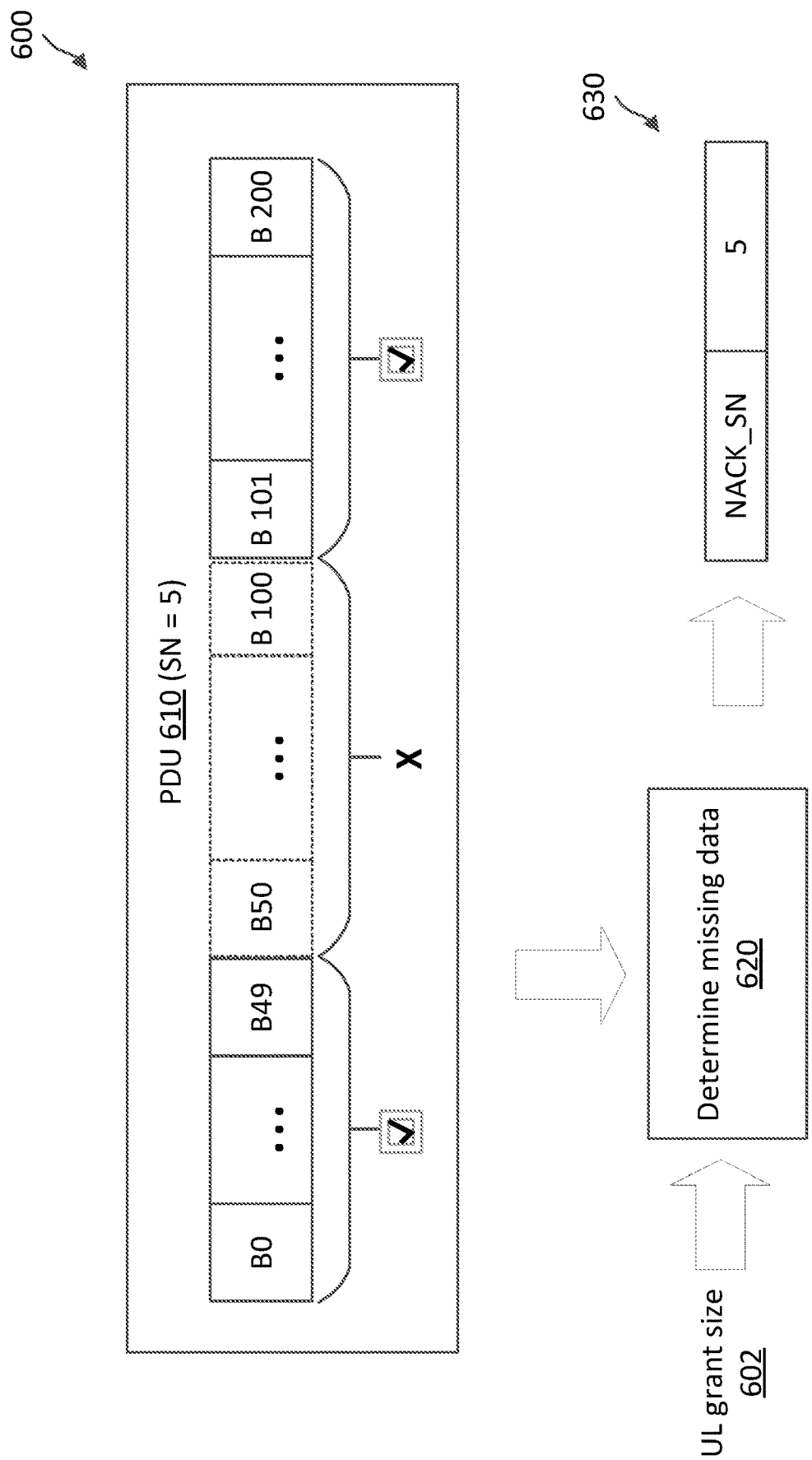
FIG. 6 illustrates a RLC status reporting scheme according to some aspects of the present disclosure.

FIG. 6 illustrates a RLC status reporting scheme 600 according to some aspects of the present disclosure. The scheme 600 may be implemented by an RLC receiving entity (e.g., the BSs 105 and/or 202 and/or the UEs 115 and/or 204) to support error control (e.g., ARQ control). In particular, the UE 204 may implement the scheme 600 to reduce the size of a RLC status report. The UE 204 may implement the scheme 600 in addition to or alternative to the methods 200 and/or 500 discussed above in relation to FIGS. 2 and/or 5, respectively. In the scheme 600, the UE 204 may maintain a RLC receive window similar to the RLC receive window 300 of FIG. 3. The UE 204 may track the reception statuses of RLC data PDUs in the RLC receive window and report missing RLC data PDUs using similar mechanisms as discussed above in the methods 200 and/or 500. For instance, the UE 204 may report a NACK SN for each missing RLC data PDU in a subset of missing RLC data PDUs (less than all missing RLC data PDUs in the RLC receive window) as discussed in the method 200 upon receiving a UL grant with an insufficient size for reporting a full RLC status report. Additionally or alternatively, the UE 204 may merge a number of missing RLC data PDUs and report a data range including the missing RLC data PDUs as discussed above in the method 500 upon receiving a UL grant with an insufficient size for reporting a full RLC status report. Additionally or alternatively, the UE 204 may track missing data segments within a RLC data PDU.

In the illustrated example of FIG. 6, the UE 204 receives a RLC data PDU 610 with an SN 5 in the sequence of RLC data PDUs. The RLC data PDU 610 may correspond to a RLC data PDU 320 of FIG. 3. The RLC data PDU 610 may include 201 bytes shown as B0 to B200. The UE 204 may determine that bytes B0 to B49 and bytes B101 to B200 are received successfully (as shown by the solid-lined boxes with checkmark below), but bytes B50 to B100 are missing (as shown by the dotted-lined box with a cross symbol "X" below). That is, bytes B50 to B100 in the RLC data PDU is a missing byte segment. The UE 204 may also receive a UL grant with a UL grant size 602 from a BS (e.g., the BS 202).

At block 620, the UE 204 may determine missing data segments from the RLC data PDU 610. The UE 204 may determine whether the UL grant size 602 may allow for a transmission of a full RLC status report including an indication for the missing byte segment B50 to B100. For instance, the UE 204 may utilize a RLC status report structure as shown in the FIG. 4. To provide status information for the missing byte segment, the RLC status report may include a NACK SN indicator 403 indicating the SN 5, an SOstart indicator 408 indicating a byte position of the byte B50 within the RLC data PDU 610, and an SOend indicator 409 indicating a byte position of the byte B100 within the RLC data PDU 610.

If the UL grant size 602 is insufficient for carrying a NACK SN indicator 403, an SOstart indicator 408, and an SOend indicator 409 along with the ACK_SN field 404, the UE 204 may discard the RLC data PDU 610 and report the RLC data PDU 610 as missing, for example, by including a NACK SN indicator including a value of 5 to indicate the SN 5 as shown by the reference numeral 630.

In some aspects, the RLC data PDU 610 may include multiple missing byte segments, where each missing byte segment may include one or more data bytes. To report each missing byte segment individually, the UE 204 may utilize about 6 bytes (e.g., 2 bytes for each of the NACK SN indicator 403, the SOstart indicator 408, and the SOend indicator 409) for each missing byte segment, while 2 bytes (e.g., 2 bytes for a NACK SN indication) may be sufficient for reporting the RLC data PDU 610 as missing. In other words, the multiple missing byte segments are non-consecutive so that if the UE 204 reports each missing byte segment individually, the UE 204 may indicate, in an RLC status report, the SN for the RLC data PDU 610, the starting byte position (SOstart indicator 408), and the ending byte position (SOend indicator 409) for each missing byte segment. As such, if the UE 204 discards the RLC data PDU 610 and reports a NACK for the RLC data PDU, the UE 204 may save about 6 bytes for each missing byte segment. In other words, the UE 204 may merge the multiple non-consecutive missing byte segments into a data range, for example, reporting the entire RLC PDU 610 as missing or indicating in the data range starting from an earliest missing byte segment of the multiple missing byte segment to a last missing byte segment of the multiple missing byte segment. As such, the reported data range may include the multiple non-consecutive missing byte segments and any received byte segments between the multiple non-consecutive missing byte segments. However, there is a tradeoff between retransmission (or bandwidth) and RLC status report size. For example, the indication of RLC data PDU 610 as missing may cause the BS 202 to retransmit the entire RLC data PDU 610 where some of the bytes (e.g., bytes B0 to B49 and bytes B101 to B200) in the RLC data PDU 610 were already successfully received by the UE 204.

While the scheme 600 is described in the context of one RLC data PDU within a sequence of RLC data PDUs including a missing byte segment, it should be understood that in other examples there may be multiple missing byte segments in one or more RLC data PDUs within a sequence of RLC data PDUs (e.g., in a second RLC data PDU with SN 2, a third RLC data PDU with SN 3, and so on).

In some aspects, the UE 204 may utilize any suitable combinations of the method 200 discussed in relation to FIG. 2, the method 500 discussed in relation to FIG. 5, and/or the scheme 600 discussed in relation to FIG. 6 to provide the BS 202 with a status of a RLC receive window, for example, when a UL grant size is insufficient for indicating each missing RLC data PDU and/or each missing data segment in the RLC receive window individually.

In some aspects, a UE 204 may generate a RLC status report based on a UL grant size using similar mechanisms as in the method 200 discussed above in relation to FIG. 2. For instance, the UE 204 may include in a RLC status report missing RLC data packets (e.g., RLC PDU and/or RLC SDUs). Additionally, the UE 204 may report missing data segments within an RLC data packet (e.g., an RLC SDU). For instance, the UE 204 successfully received RLC data packets with SN 0 to SN 5 from a transmitter (e.g., the BS 202) with no missing data segment in any of the RLC data packets SN 0 to SN 5, but fails to receive all data segments of RLC data packet with SN 6. The data segments may be similar to data segments shown in FIG. 6, where each segment includes a number of consecutive data bytes. For example, the UE 204 successfully received segments 0, 2, and 4 of the RLC data packet with SN 6, but fails to receive segments 1 and 3. The UE 204 can include in the RLC status report a NACK SN (e.g., the NACK SN indicator 403) indicating SN 6. To report the missing data segments, the UE 204 may include in the RLC status report a SOstart indicator 408 and a SOend indicator 409 as discussed above in relation to FIG. 4 for each missing segment. For instance, to report the missing segment 1 of the RLC data packet SN 6, the UE 204 may include in the RLC status report a first SOstart indicator and a SOend indicator indicating a starting byte position and an ending byte position, respectively, of the missing segment 1. To report the missing segment 3 of the RLC data packet SN 6, the UE 204 may include in the RLC status report a first SOstart indicator and a SOend indicator indicating a starting byte position and an ending byte position, respectively, of the missing segment 3.

If the UE 204 receives a UL grant that does not provide a sufficient amount of resources for a full RLC status report to be sent, the UE 204 may truncate the RLC status report. Due to the truncation, the UE 204 may include in the RLC status report an indication (e.g., the SOstart and SOend indicators) of the missing segment 1, but may not include an indication of the missing segment 3. Since the UE 204 indicated the RLC data packet with SN 6 (NACK SN=6) as missing, the UE 204 may set ACK SN to 7 to indicate a next expected SN 7 from the transmitter. However, this may cause the transmitter to determine that all segments of the RLC data packet SN 6 are fully received except for segment 1, which is incorrect.

To avoid a misalignment or an out-of-sync condition in RLC statuses between a receiver (e.g., the UE 204) and a transmitter (e.g., the BS 202), the receiver may set ACK SN in a RLC status report to a next expected SN only if all missing segments for a NACK are indicated in the RLC status report. In other words, the ACK SN (e.g., the ACK SN field 404) may be set to the SN of a next expected (e.g., not received) RLC data packet (e.g., RLC SDU) which is not fully indicated as missing in the resulting RLC status report (e.g., RLC status PDU). Referring to the example discussed above where the truncated RLC status report may indicate the missing segment 1 of the RLC data packet SN 6, but not the missing segment 3 of the RLC data packet SN 6, the UE 204 may set the ACK SN to 6 in the truncated RLC status report since not all segments of the RLC data packet with SN 6 are fully indicated in the RLC status report due to the RLC status report being truncated. The indication of SN 6 for the ACK SN in the RLC status report will cause the transmitter not to consider the remaining segments of the RLC data packet SN 6, other than segment 1, as received correctly. Thus, the transmitter may retransmit segments of the RLC data packet SN 6 that are considered as not being received correctly by the UE 204. As such, the UE 204 may receive the missing segment 3 that was not indicated in the RLC status report.

Figure 7:
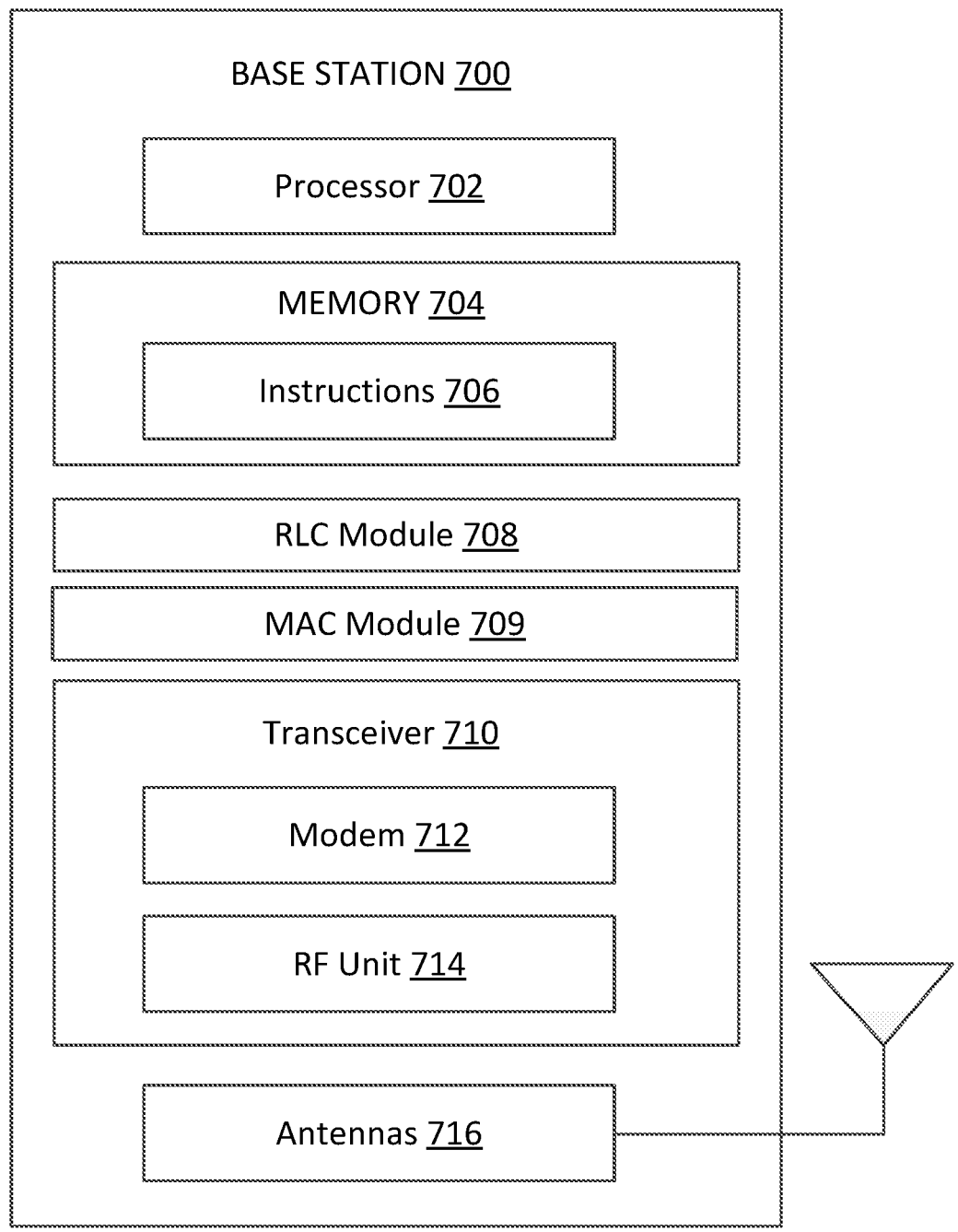
FIG. 7 is a block diagram of an exemplary base station (BS) according to some aspects of the present disclosure.

FIG. 7 is a block diagram of an exemplary BS 700 according to some aspects of the present disclosure. The BS 700 may be a BS 105 in the network 100 as discussed above in FIG. 1 or a BS 202 as discussed above in FIGS. 2 and 5. As shown, the BS 700 may include a processor 702, a memory 704, an RLC module 708, a MAC module 709, a transceiver 710 including a modem subsystem 712 and a RF unit 714, and one or more antennas 716. These elements may be coupled with one another. The term "coupled" may refer to directly or indirectly coupled or connected to one or more intervening elements. For instance, these elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 2-6. Instructions 706 may also be referred to as program code. The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the RLC module 708 and the MAC module 709 may be implemented via hardware, software, or combinations thereof. For example, each of the RLC module 708 and the MAC module 709 may be implemented as a processor, circuit, and/or instructions 706 stored in the memory 704 and executed by the processor 702. In some examples, the RLC module 708 and the MAC module 709 can be integrated within the modem subsystem 712. For example, the RLC module 708 and the MAC module 709 can be implemented by a combination of software components (e.g., executed by a DSP or a general processor) and hardware components (e.g., logic gates and circuitry) within the modem subsystem 712. In some examples, a BS may include one of the RLC module 708 and the MAC module 709. In other examples, a BS may include both the RLC module 708 and the MAC module 709.

The RLC module 708 and the MAC module 709 may be used for various aspects of the present disclosure, for example, aspects of FIGS. 2-6. The RLC module 708 is configured to prepare a sequence of RLC data PDUs and transmit the sequence of RLC data PDUs to, for example, a UE 115 or 204. The sequence of RLC data PDUs may be transmitted using the transceiver 710 and the antennas 716. The RLC module 708 is further configured to receive one or more RLC status reports, for example, from the UE 115 or 204, by way of the antennas 716 and the transceiver 710, indicating which data PDUs were successfully received and which were not. The RLC status reports may be configured as shown in FIG. 4.

In some aspects, the RLC module 708 may be configured to receive a first RLC status report indicating NACKs for a first subset of missing RLC data PDUs in the sequence of RLC data PDUs, for example, due to a poor channel condition. Subsequently, the RLC module 708 may further be configured to receive a second RLC status report indicating a second subset of missing RLC data PDUs in the sequence of the RLC data PDUs, where the second subset may include the first subset, for example, when the UE 115 or 204 applies the method 200 for RLC status report transmissions.

In some aspects, the RLC module 708 may be configured to receive a RLC status report indicating a data range in the sequence of RLC data PDUs including one or more missing data segments. The one or more missing data segments may correspond to one or more missing RLC data PDUs in the sequence of RLC data PDUs, for example, when the UE 115 or 204 applies the method 500 for RLC status report transmissions. Alternatively, the one or more missing data segments may correspond to one or more missing byte segments in one or more RLC data PDUs of the sequence the RLC data PDUs, for example, when the UE 115 or 204 applies the scheme 600 for RLC status report transmissions. The RLC module 708 may be further configured to perform RLC AM operations, for example, retransmitting RLC data PDUs with NACKs in a received RLC status reports.

The MAC module 709 is configured to receive a BSR, for example, from a UE 115 or 204. In some examples, the BSR may be associate with a RLC status report. The MAC module 709 may also be configured to allocate radio resources for the UE 115 or 204 and determine a MCS to be used for a transmission in the allocated radio resource based on the BSR. The MAC module 709 may also be configured to transmit a UL grant to the UE 115 or 204. The UL grant may indicate the allocated radio resources and the MCS.

As shown, the transceiver 710 may include the modem subsystem 712 and the RF unit 714. The transceiver 710 can be configured to communicate bi-directionally with other devices, such as the UEs 115 and/or 300 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., RRC configuration, UL grants, or RLC data PDUs) from the modem subsystem 712 (on outbound transmissions) or of transmissions originating from another source such as a UE 115 and/or UE 204. The RF unit 714 may be further configured to perform analog beamforming in conjunction with the digital beamforming. Although shown as integrated together in transceiver 710, the modem subsystem 712 and/or the RF unit 714 may be separate devices that are coupled together at the BS 105 to enable the BS 105 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, transmission of information to complete attachment to a network and communication with a camped UE 115 or 204 according to some aspects of the present disclosure. The antennas 716 may further receive data messages transmitted from other devices and provide the received data messages for processing and/or demodulation at the transceiver 710. The transceiver 710 may provide the demodulated and decoded data (e.g., RLC status reports, BSRs) to the RLC module 708 and the MAC module 709 for processing. The antennas 716 may include multiple antennas of similar or different designs in order to sustain multiple transmission links.

In an aspect, the BS 700 can include multiple transceivers 710 implementing different RATs (e.g., NR and LTE). In an aspect, the BS 700 can include a single transceiver 710 implementing multiple RATs (e.g., NR and LTE). In an aspect, the transceiver 710 can include various components, where different combinations of components can implement different RATs.

Figure 8:
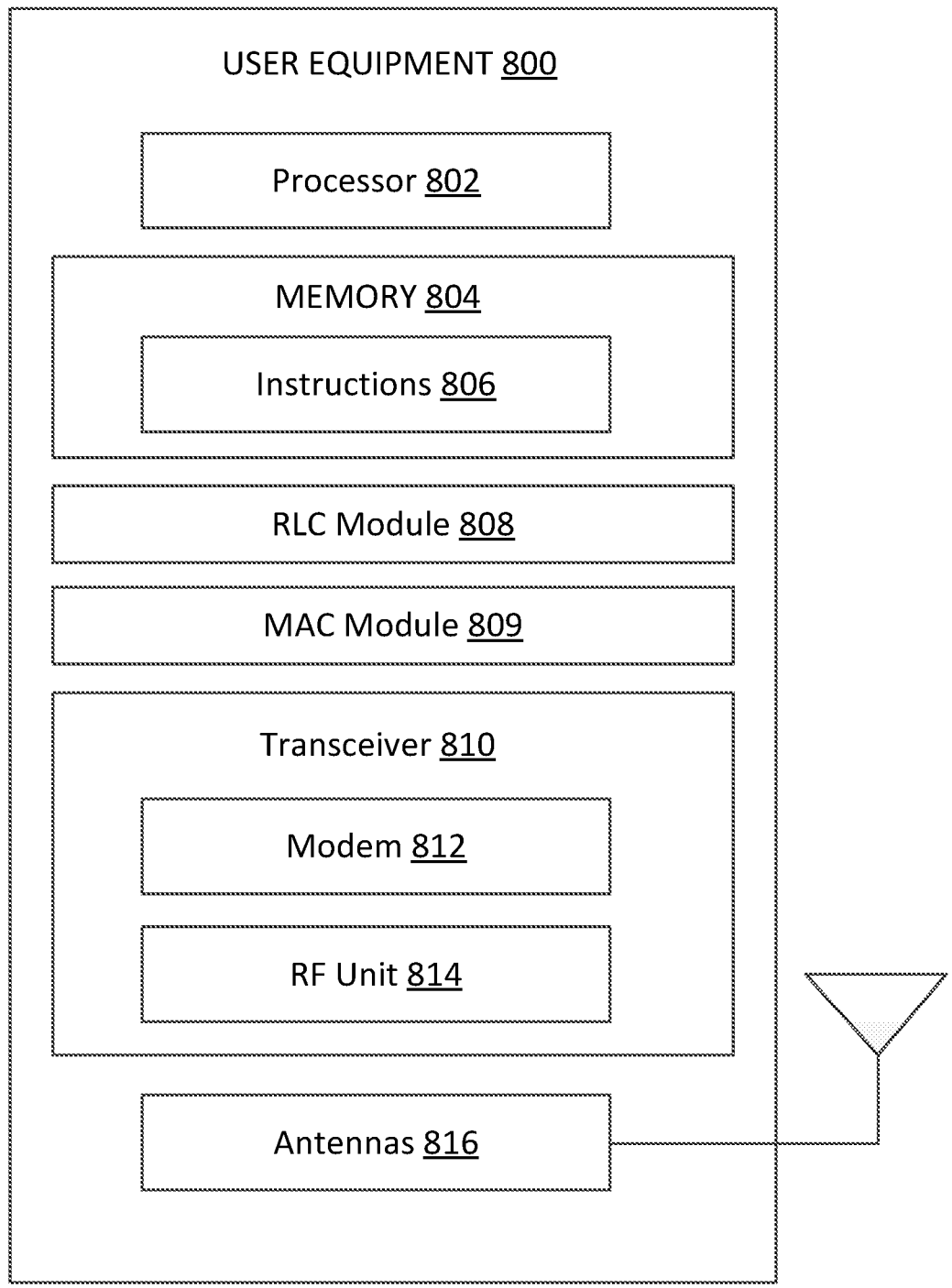
FIG. 8 is a block diagram of an exemplary user equipment (UE) according to some aspects of the present disclosure.

FIG. 8 is a block diagram of an exemplary UE 800 according to some aspects of the present disclosure. The UE 800 may be a UE 115 as discussed above with respect to FIG. 1. As shown, the UE 800 may include a processor 802, a memory 804, an RLC module 808, a MAC module 809, a transceiver 810 including a modem subsystem 812 and a radio frequency (RF) unit 814, and one or more antennas 816. These elements may be coupled with one another. The term "coupled" may refer to directly or indirectly coupled or connected to one or more intervening elements. For instance, these elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to the UEs 115 and/or 20 in connection with aspects of the present disclosure, for example, aspects of FIGS. 2-6 and 9-10. Instructions 806 may also be referred to as program code, which may be interpreted broadly to include any type of computer-readable statement(s) as discussed above with respect to FIG. 7.

Each of the RLC module 808 and the MAC module 809 may be implemented via hardware, software, or combinations thereof. For example, each of the RLC module 808 and the MAC module 809 may be implemented as a processor, circuit, and/or instructions 806 stored in the memory 804 and executed by the processor 802. In some examples, the RLC module 808 and the MAC module 809 can be integrated within the modem subsystem 812. For example, the RLC module 808 and the MAC module 809 can be implemented by a combination of software components (e.g., executed by a DSP or a general processor) and hardware components (e.g., logic gates and circuitry) within the modem subsystem 812. In some examples, a BS may include one of the RLC module 808 and the MAC module 809. In other examples, a BS may include both the RLC module 808 and the MAC module 809.

The RLC module 808 and the MAC module 809 may be used for various aspects of the present disclosure, for example, aspects of FIGS. 2-6 and 9-10. The RLC module 808 is configured to receive one or more RLC PDUs of a sequence of RLC PDUs (e.g., the RLC data PDUs 320), for example, from a BS 105, 202, or 700. Each RLC data PDU in the sequence of RLC data PDUs may be associated with a SN. The RLC module 808 may be configured to configure a portion of the memory 804 as a RLC receive window (e.g., the RLC receive window 300) and store the one or more RLC PDUs in the RLC receive window and track the delivery status of the sequence of RLC PDUs in the RLC receive window. The RLC module 808 is further configured to determine missing RLC data PDUs in the sequence of RLC PDUs based on the received one or more RLC PDUs. The RLC module 808 may fail to receive the RLC data PDUs due to various reasons, such as a poor channel conditions. The RLC module 808 is further configured to receive a first UL grant from the BS 105, 202, or 700, determine a size of the first UL grant, and transmit a RLC status report to the BS 105, 202, or 700 based on the size of the UL grant. The RLC module 808 is further configured transmit a first RLC status report including an indication of a first subset of the missing RLC PDUs less than all the missing RLC PDUs, where the indication of the first subset of missing PDUs is based on a size of the first UL grant. The RLC module 808 is further configured to modify a RLC status prohibit timer based on the transmitted first RLC status report indicating less than all the missing RLC PDUs.

In some aspects, as part of modifying the RLC status prohibit timer, the RLC module 808 may be further configured to refrain from starting the RLC status prohibit timer based on the transmitted first RLC status report indicating less than all the missing RLC PDUs. In some other aspects, as part of modifying the RLC status prohibit timer, the RLC module 808 may further be configured to select a first RLC status timer value between the first RLC status timer value and a second RLC status timer value based on the transmitted first RLC status report indicating less than all the missing RLC PDUs, where the first RLC status timer value is less than the second RLC status timer value. In other words, the RLC module 808 may start a RLC prohibit status timer with a reduced timer value when a partial RLC status report is transmitted instead of the first RLC status timer value, which may be defined for prohibiting a RLC status report transmission after a full RLC status report is transmitted.

In some aspects, the RLC module 808 may be further configured to generate the first RLC status report, where a size of the first RLC status report is based on the size of the UL grant.

In some aspects, the RLC module 808 may be further configured to receive a second UL grant after the first UL grant. The RLC module 808 may be further configured to transmit a second RLC status report including an indication of a second subset of the missing RLC PDUs including the first subset of the missing RLC PDUs based on the second UL grant. In some examples, the RLC module 808 may be configured to continue to send a RLC status report in a next UL grant (e.g., the second UL grant) based on the transmitted first RLC status report including an indication of a first subset of the missing RLC PDUs less than all the missing RLC PDUs.

In some aspects, the RLC module 808 may be further configured to start the RLC status prohibit timer based on a determination that the second subset of the missing RLC PDUs in the second RLC status report includes all the missing RLC PDUs in the sequence of RLC PDUs.

In some aspects, the RLC module 808 may be further configured to coordinate with the MAC module 809 to transmit a BSR after transmitting the first RLC status report based on a RLC status report size for indicating all the missing RLC PDUs in the sequence of RLC PDUs. For instance, the BSR may indicate a full RLC status report size for indicating all the missing RLC PDUs in the sequence of RLC PDUs. In some other aspects, as part of the transmitting the first RLC status report, the RLC module 808 may further be configured to coordinate with the MAC module 809 to transmit a communication signal (e.g., a MAC TB) including a BSR and the first RLC status report, where the BSR is based on a RLC status report size for indicating all the missing RLC PDUs in the sequence of RLC PDUs.

In some aspects, as part of the transmitting the first RLC status report, the RLC module 808 may be further be configured to transmit the first RLC status report while in a RLC status report triggered state. The RLC module 808 may further be configured to determine to remain in the RLC status report triggered state based on the first RLC status report indicating less than all the missing RLC PDUs in the sequence of RLC PDUs.

The MAC module 809 is configured to transmit a BSR, for example, based on a full RLC status report size for indicating all the missing RLC PDIs in a sequence of RLC PDUs associated with a RLC receive window. The MAC module 809 may also be configured to receive a UL grant, for example, from a BS 105, 202, or 700, and determine a TB size based on the UL grant. The MAC module 809 may determine whether a full RLC status report (e.g., indicating all missing RLC data PDUs without optimization) may be transmitted based on the TB size. If a full RLC status report cannot be transmitted using the UL grant, the MAC module 809 may coordinate with the RLC module 808 to optimize the size of a RLC status report.

In some aspects, the RLC module 808 is configured to determine one or more missing data segments in a sequence of RLC PDUs, for example, received from a BS 105, 202, or 700, based on the received one or more RLC PDUs, receive a UL grant from the BS 105, 202, or 700, transmits a RLC status report indicating that a data range in the sequence of RLC PDUs includes missing data based on the one or more missing data segments, where the indication of the data range is based on a size of the UL grant.

In some aspects, the one or more missing data segments may correspond to one or more missing RLC PDUs as discussed above in the method 500 with reference to FIG. 5. For instance, as part of determining the one or more missing data segments, the RLC module 808 may be further configured to determine a first missing RLC PDU and a second missing RLC PDU in the sequence of RLC PDUs, where the first missing RLC PDU and the second missing RLC PDU are spaced apart by at least a third RLC PDU of the one or more received RLC PDUs based on a first sequence number (e.g., SN 1) associated with the first missing RLC PDU, a second sequence number (e.g., SN 3) associated with the second missing RLC PDU, and a third sequence number (e.g., SN 2) of the third RLC PDU. In some aspects, the RLC module 808 may further be configured to determine to include the data range in the RLC status report based on at least one of a quantity of missing RLC PDUs between the first missing RLC PDU and the second missing RLC PDU or the size of the UL grant. For example, the UL grant size may be insufficient to carry a full RLC status report. In some aspects, as part of transmitting the RLC status report, the RLC module 808 may transmit the RLC status report indicating the first sequence number of the first missing RLC PDU and a quantity of consecutive RLC PDUs from the first missing RLC PDU to the second missing RLC PDU in the sequence pf RLC PDUs.

In some aspects, the one or more missing data segments may correspond to one or more missing byte segments as discussed above in the scheme 600 with reference to FIG. 6.

For instance, as part of determining the one or more missing data segments, the RLC module 808 may further be configured to determine one or more missing byte segments (non-consecutive or non-contiguous) in at least a first RLC PDU of the one or more received RLC PDUs, where the one or more missing byte segments are less than all bytes in the first RLC PDU. In some aspects, the RLC module 808 may be further configured to determine to include the data range in the RLC status report based on at least one of a quantity of the one or more missing byte segments or the size of the UL grant. In some aspects, as part of transmitting the RLC status report, the RLC module 808 may further be configured to transmit the RLC status report indicating a sequence number associated with the first RLC PDU.

As shown, the transceiver 810 may include the modem subsystem 812 and the RF unit 814. The transceiver 810 can be configured to communicate bi-directionally with other devices, such as the BSs 105. The modem subsystem 812 may be configured to modulate and/or encode the data from the memory 804 and/or the RLC module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., RLC status reports and UE capability report) from the modem subsystem 812 (on outbound transmissions) or of transmissions originating from another source such as a UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 115 to enable the UE 115 to communicate with other devices.

The RF unit 814 may provide the modulated and/or processed data, e.g. data packets (or, more generally, data messages that may include one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., RLC data PDUs and RRC configuration) to the RLC module 808 for processing. The antennas 816 may include multiple antennas of similar or different designs in order to sustain multiple transmission links. The RF unit 814 may configure the antennas 816.

In an aspect, the UE 800 can include multiple transceivers 810 implementing different RATs (e.g., NR and LTE). In an aspect, the UE 800 can include a single transceiver 810 implementing multiple RATs (e.g., NR and LTE). In an aspect, the transceiver 810 can include various components, where different combinations of components can implement different RATs.

While FIG. 7 describes the RLC module 708 at the BS 700 in the context of an RLC transmitting entity and FIG. 8 describes the RLC module 808 at the UE 800 in the context of an RLC receiving entity, in some embodiments, the RLC module 708 at the BS 700 may operate as an RLC receiving entity and the RLC module 808 at the UE 800 may operate as an RLC transmitting entity. In other words, the RLC module 708 may implement at least some functionalities of the RLC module 808 described above. Similarly, the RLC module 808 may implement at least some functionalities of the RLC module 708 described above.

Figure 9:
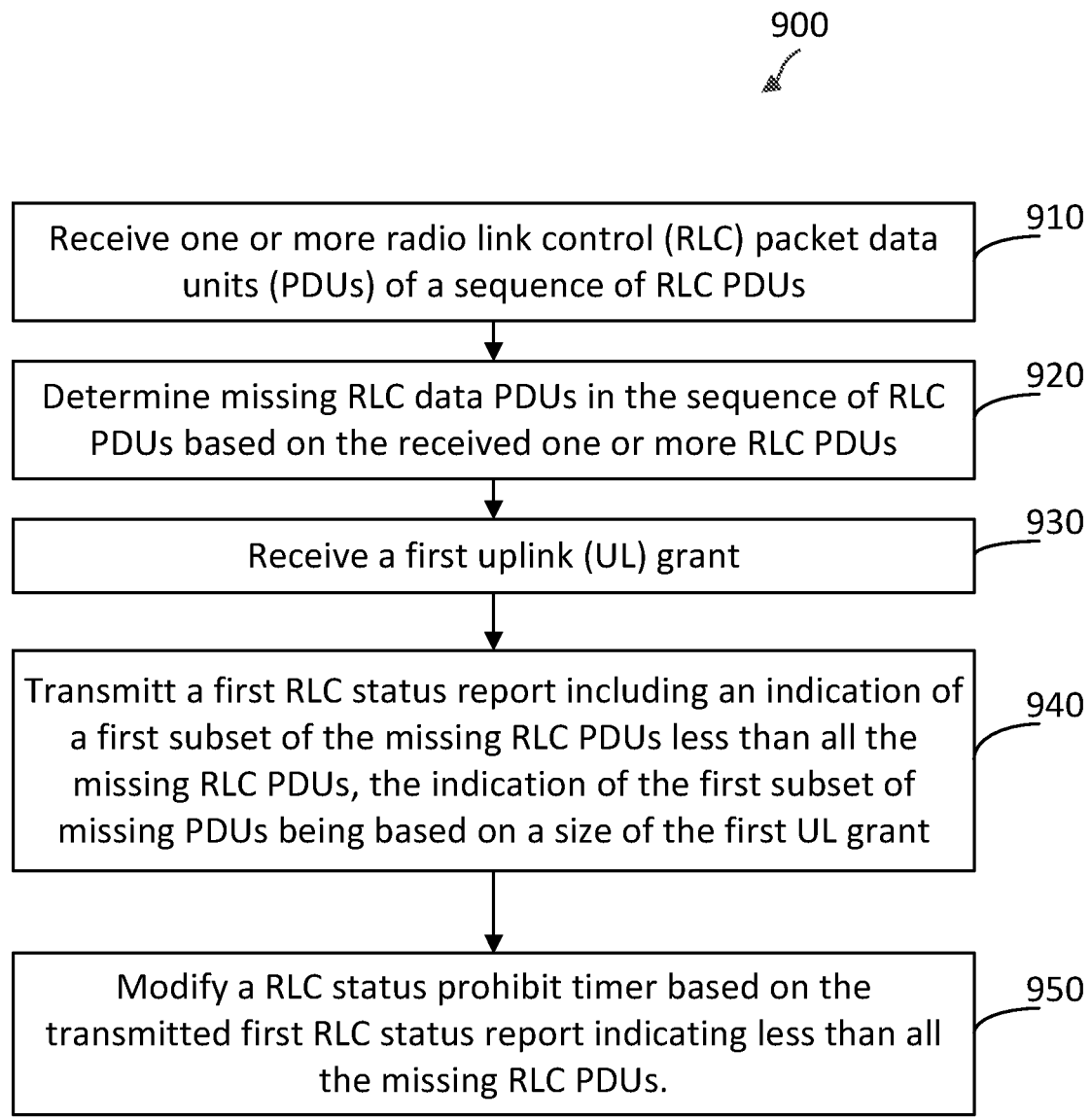
FIG. 9 is a flow diagram of a wireless communication method according to some aspects of the present disclosure.

FIG. 9 is a flow diagram of a wireless communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the UEs 115, 204, or 800, may utilize one or more components, such as the processor 802, the memory 804, the RLC module 808, the transceiver 810, the modem 812, and the one or more antennas 816, to execute the steps of method 900. The method 900 may employ similar mechanisms as described above in FIGS. 2-3. As illustrated, the method 900 includes a number of enumerated steps, but aspects of the method 900 may include additional steps before, after, and in between the enumerated steps. In some aspects, one or more of the enumerated steps may be omitted or performed in a different order.

At block 910, the wireless communication device receives one or more RLC PDUs of a sequence of RLC PDUs (e.g., the RLC data PDUs 320). In some instances, the wireless communication device may correspond to a UE 115, 204, or 800 and receive the one or RLC PDUs from a BS 105, 202, or 700. In some instances, the wireless communication device may utilize one or more components, such as the processor 802, the memory 804, the RLC module 808, the MAC module 809, the transceiver 810, the modem 812, and the one or more antennas 816, to receive the one or more RLC PDUs.

In some aspects, the wireless communication device may store the one or more RLC PDUs in a RLC receive window (e.g., the RLC receive window 300) associated with the sequence of RLC PDUs. For example, the wireless communication device may track the delivery status of the sequence of RLC PDUs in the RLC receive window. In some instances, the wireless communication device may configure a portion of a memory (e.g., the memory 804) of the wireless communication device as the RLC receive window.

At block 920, the wireless communication device determines missing RLC data PDUs in the sequence of RLC PDUs based on the received one or more RLC PDUs. In some instances, the wireless communication device may utilize one or more components, such as the processor 802, the memory 804, the RLC module 808, the MAC module 809, the transceiver 810, the modem 812, and the one or more antennas 816, to determine the missing RLC data PDUs in the sequence of RLC PDUs based on the received one or more RLC PDUs. In some instances, the wireless communication device may utilize one or more components, such as the processor 802, the memory 804, the RLC module 808, the transceiver 810, the modem 812, and the one or more antennas 816, to At block 930, the wireless communication device receives a first UL grant. In some instances, the wireless communication device may utilize one or more components, such as the processor 802, the memory 804, the RLC module 808, the MAC module 809, the transceiver 810, the modem 812, and the one or more antennas 816, to receive the first UL grant.

At block 940, the wireless communication device transmits a first RLC status report including an indication of a first subset of the missing RLC PDUs less than all the missing RLC PDUs, where the indication of the first subset of missing PDUs is based on a size of the first UL grant. In some instances, the wireless communication device may utilize one or more components, such as the processor 802, the memory 804, the RLC module 808, the MAC module 809, the transceiver 810, the modem 812, and the one or more antennas 816, to transmit the first RLC status report.

At block 950, the wireless communication device modifies a RLC status prohibit timer based on the transmitted first RLC status report indicating less than all the missing RLC PDUs. In some instances, the wireless communication device may utilize one or more components, such as the processor 802, the memory 804, the RLC module 808, the MAC module 809, the transceiver 810, the modem 812, and the one or more antennas 816, to modify the RLC status prohibit timer.

In some aspects, as part of modifying the RLC status prohibit timer, the wireless communication device may refrain from starting the RLC status prohibit timer based on the transmitted first RLC status report indicating less than all the missing RLC PDUs. In some aspects, as part of modifying the RLC status prohibit timer, the wireless communication device may select a first RLC status timer value between the first RLC status timer value and a second RLC status timer value based on the transmitted first RLC status report indicating less than all the missing RLC PDUs, where the first RLC status timer value is less than the second RLC status timer value.

In some aspects, the wireless communication device may further generate the first RLC status report, where a size of the first RLC status report is based on the size of the UL grant.

In some aspects, the wireless communication device may further receives a second UL grant after the first UL grant. The wireless communication device may further transmit a second RLC status report including an indication of a second subset of the missing RLC PDUs including the first subset of the missing RLC PDUs based on the second UL grant. In some examples, the wireless communication device may continue to send a RLC status report, for example, to a BS (e.g., the BS 105, 202, and/or 700), in a next UL grant (e.g., the second UL grant) based on the transmitted first RLC status report including an indication of a first subset of the missing RLC PDUs less than all the missing RLC PDUs.

In some aspects, the wireless communication device may further start the RLC status prohibit timer based on a determination that the second subset of the missing RLC PDUs in the second RLC status report includes all the missing RLC PDUs in the sequence of RLC PDUs.

In some aspects, the wireless communication device may further transmit, after transmitting the first RLC status report, a BSR based on a RLC status report size for indicating all the missing RLC PDUs in the sequence of RLC PDUs. In some other aspects, as part of the transmitting the first RLC status report, the wireless communication device may transmit a communication signal including a BSR and the first RLC status report, where the BSR is based on a RLC status report size for indicating all the missing RLC PDUs in the sequence of RLC PDUs. For instance, the communication signal may include a MAC TB including the RLC status report (e.g., a RLC level report) and the BSR (e.g., a MAC level report).

In some aspects, as part of the transmitting the first RLC status report, the wireless communication device may transmit the first RLC status report while in a RLC status report triggered state. The wireless communication device may further determine to remain in the RLC status report triggered state based on the first RLC status report indicating less than all the missing RLC PDUs in the sequence of RLC PDUs.

In some aspects, a wireless communication device (e.g., UEs 115, 204, or 800) receives one or more radio link control (RLC) data packets of a sequence of RLC data packets (e.g., RLC PDUs and/or SDUs). The wireless communication device may also determine a plurality of missing data segments in a first RLC data packet of the sequence of RLC data packets based on the received one or more RLC data packets, the first RLC data packet having a first sequence number. The wireless communication device may also receive an uplink (UL) grant. The wireless communication device may also generate a RLC status report. As part of generating the RLC status report, the wireless communication device may generate an indication (e.g., the SOstart indicator 408 and the SOend indicator 409) for less than all missing data segments of the plurality of missing data segments for the first sequence number based on a size of the UL grant. As part of generating the RLC status report, the wireless communication device may also assign the first sequence number (e.g., a given RLC SN) to an ACK SN indication (e.g., the ACK SN field 404) based on the RLC status report including the indication for less than all missing data segments of the plurality of missing data segments (of the given RLC SN). The wireless communication device may also transmit the RLC status report.

Figure 10:
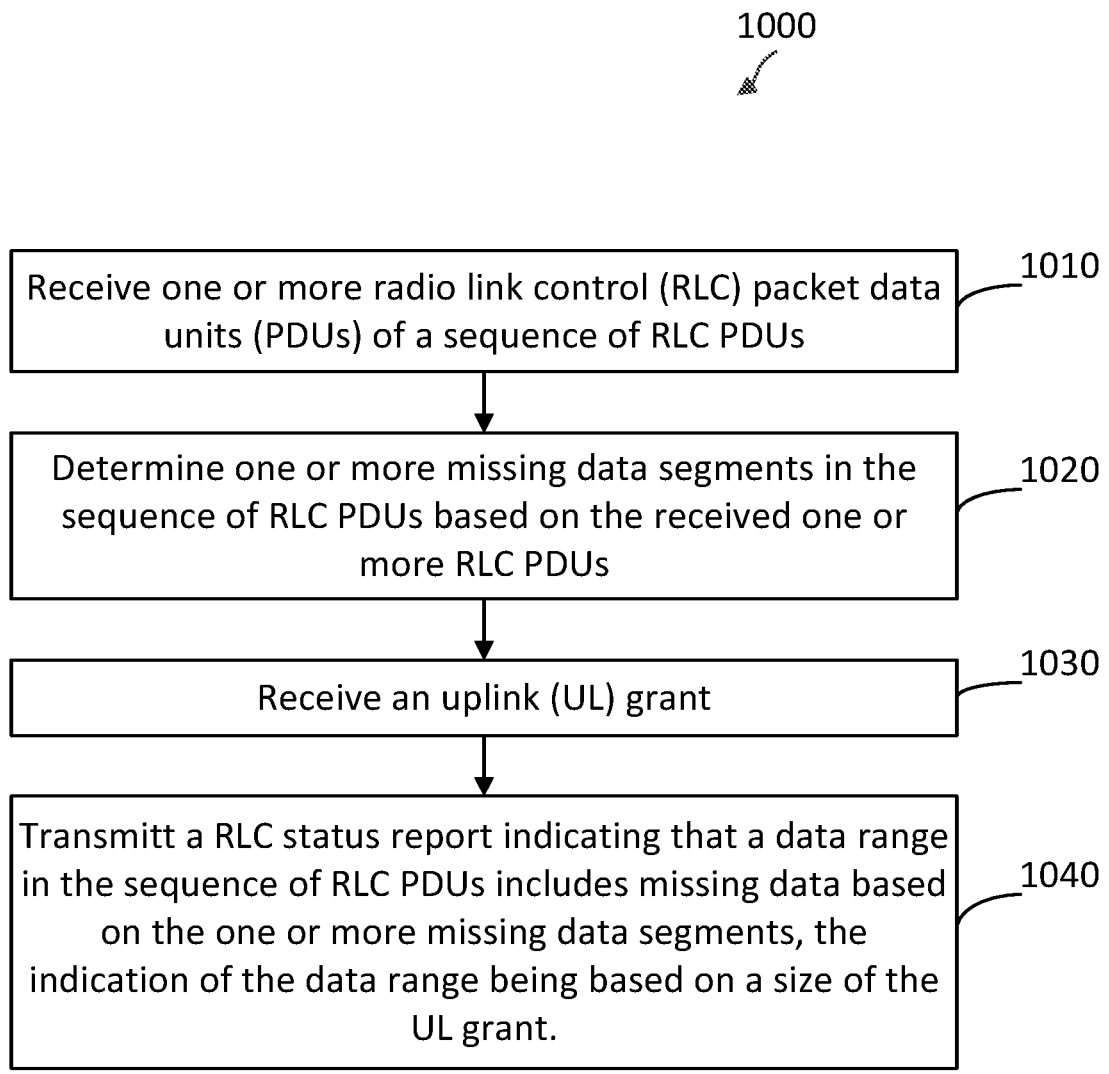
FIG. 10 is a flow diagram of a wireless communication method according to some aspects of the present disclosure.

FIG. 10 is a flow diagram of a wireless communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UEs 115, 204, or 800, may utilize one or more components, such as the processor 802, the memory 804, the RLC module 808, the transceiver 810, the modem 812, and the one or more antennas 816, to execute the steps of method 1000. The method 1000 may employ similar mechanisms as described above in FIGS. 2-6. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, the wireless communication device receives one or more RLC PDUs of a sequence of RLC PDUs (e.g., the RLC data PDUs 320). In some instances, the wireless communication device may correspond to a UE 115, 204, or 800 and receive the one or RLC PDUs from a BS 105, 202, or 700. In some instances, the wireless communication device may utilize one or more components, such as the processor 802, the memory 804, the RLC module 808, the MAC module 809, the transceiver 810, the modem 812, and the one or more antennas 816, to receive the one or more RLC PDUs of the sequence of RLC PDUs.

In some aspects, the wireless communication device may store the one or more RLC PDUs in a RLC receive window (e.g., the RLC receive window 300) associated with the sequence of LRC PDUs. For example, the wireless communication device may track the delivery status of the sequence of RLC PDUs in the RLC receive window. In some instances, the wireless communication device may configure a portion of a memory (e.g., the memory 804) of the wireless communication device as the RLC receive window.

At block 1020, the wireless communication device determines one or more missing data segments in the sequence of RLC PDUs based on the received one or more RLC PDUs. In some instances, the wireless communication device may utilize one or more components, such as the processor 802, the memory 804, the RLC module 808, the MAC module 809, the transceiver 810, the modem 812, and the one or more antennas 816, to determine the one or more missing data segments in the sequence of RLC PDUs.

At block 1030, the wireless communication device receives a UL grant. In some instances, the wireless communication device may utilize one or more components, such as the processor 802, the memory 804, the RLC module 808, the MAC module 809, the transceiver 810, the modem 812, and the one or more antennas 816, to receive the UL grant.

At block 1040, the wireless communication device transmits a RLC status report indicating that a data range in the sequence of RLC PDUs includes missing data based on the one or more missing data segments, where the data range includes at least one received data segment and the indication of the data range is based on a size of the UL grant. In some instances, the wireless communication device may utilize one or more components, such as the processor 802, the memory 804, the RLC module 808, the MAC module 809, the transceiver 810, the modem 812, and the one or more antennas 816, to transmit the RLC status report indicating the data range in the sequence of RLC PDUs includes the missing data based on the one or more missing data segments.

In some aspects, the one or more missing data segments determined at block 1020 may correspond to one or more missing RLC PDUs as discussed above in the method 500 with reference to FIG. 5. For instance, as part of determining the one or more missing data segments at block 1020, the wireless communication device may determine a first missing RLC PDU and a second missing RLC PDU in the sequence of RLC PDUs, the first missing RLC PDU and the second missing RLC PDU spaced apart by at least a third RLC PDU of the one or more received RLC PDUs based on a first sequence number (e.g., SN 1) associated with the first missing RLC PDU, a second sequence number (e.g., SN 3) associated with the second missing RLC PDU, and a third sequence number (e.g., SN 2) of the third RLC PDU. In some aspects, the wireless communication device may further determine to include the data range in the RLC status report based on at least one of a quantity of missing RLC PDUs between the first missing RLC PDU and the second missing RLC PDU or the size of the UL grant. For example, the UL grant size may be insufficient to carry a full RLC status report. In some aspects, as part of transmitting the RLC status report at block 1040, the wireless communication device may transmit the RLC status report indicating the first sequence number of the first missing RLC PDU and a quantity of consecutive RLC PDUs from the first missing RLC PDU to the second missing RLC PDU in the sequence of RLC PDUs.

In some aspects, the one or more missing data segments determined at block 1020 may correspond to one or more missing byte segments as discussed above in the scheme 600 with reference to FIG. 6. For instance, as part of determining the one or more missing data segments, the wireless communication device may determine one or more missing byte segments (that are non-consecutive or non-contiguous) in at least a first RLC PDU of the one or more received RLC PDUs, the one or more missing byte segments being less than all bytes in the first RLC PDU. In some aspects, the wireless communication device may further determine to include the data range in the RLC status report based on at least one of a quantity of the one or more missing byte segments or the size of the UL grant, where the data range may include the one or more missing byte segments. In some aspects, as part of transmitting the RLC status report at block 1040, the wireless communication device may transmit the RLC status report indicating a sequence number associated with the first RLC PDU.

Further aspects of the present disclosure are provided below.

Aspect 1 includes a method of wireless communication performed by a wireless communication device, comprising receiving one or more radio link control (RLC) packet data units (PDUs) of a sequence of RLC PDUs; determining missing RLC data PDUs in the sequence of RLC PDUs based on the received one or more RLC PDUs; receiving a first uplink (UL) grant; transmitting a first RLC status report including an indication of a first subset of the missing RLC PDUs less than all the missing RLC PDUs, the indication of the first subset of missing PDUs being based on a size of the first UL grant; and modifying a RLC status prohibit timer based on the transmitted first RLC status report indicating less than all the missing RLC PDUs.

Aspect 2 includes the method of aspect 1, wherein the modifying the RLC status prohibit timer comprises refraining from starting the RLC status prohibit timer based on the transmitted first RLC status report indicating less than all the missing RLC PDUs.

Aspect 3 includes the method of aspect 1, wherein the modifying the RLC status prohibit timer comprises selecting a first RLC status timer value between the first RLC status timer value and a second RLC status timer value based on the transmitted first RLC status report indicating less than all the missing RLC PDUs, wherein the first RLC status timer value is less than the second RLC status timer value.

Aspect 4 includes the method of any of aspects 1-3, wherein the sequence of RLC PDUs is associated with a RLC receive window.

Aspect 5 includes the method of any of aspects 1-4, further comprising generating the first RLC status report, wherein a size of the first RLC status report is based on the size of the UL grant.

Aspect 6 includes the method of any of aspects 1-5, further comprising receiving a second UL grant after the first UL grant; and transmitting a second RLC status report including an indication of a second subset of the missing RLC PDUs including the first subset of the missing RLC PDUs based on the second UL grant.

Aspect 7 includes the method of any of aspects 1-6, further comprising starting the RLC status prohibit timer based on a determination that the second subset of the missing RLC PDUs in the second RLC status report includes all the missing RLC PDUs in the sequence of RLC PDUs.

Aspect 8 includes the method of any of aspects 1-5, further comprising transmitting, after transmitting the first RLC status report, a buffer status report (BSR) based on a RLC status report size for indicating all the missing RLC PDUs in the sequence of RLC PDUs.

Aspect 9 includes the method of any of aspects 1-5, wherein the transmitting the first RLC status report further comprises transmitting a communication signal including a buffer status report (BSR) and the first RLC status report, the BSR being based on a RLC status report size for indicating all the missing RLC PDUs in the sequence of RLC PDUs.

Aspect 10 includes the method of any of aspects 1-5, wherein the transmitting the first RLC status report comprises transmitting, while in a RLC status report triggered state, the first RLC status report; and the method further comprises determining to remain in the RLC status report triggered state based on the first RLC status report indicating less than all the missing RLC PDUs in the sequence of RLC PDUs.

Aspect 11 includes a method of wireless communication performed by a wireless communication device, comprising receiving one or more radio link control (RLC) packet data units (PDUs) of a sequence of RLC PDUs; determining one or more missing data segments in the sequence of RLC PDUs based on the received one or more RLC PDUs; receiving an uplink (UL) grant; and transmitting a RLC status report indicating that a data range in the sequence of RLC PDUs includes missing data based on the one or more missing data segments, wherein the data range includes at least one received data segment, and wherein the indication of the data range is based on a size of the UL grant.

Aspect 12 includes the method of aspect 11, wherein the sequence of RLC PDUs is associated with a RLC receive window.

Aspect 13 includes the method of any of aspects 11-12, wherein the determining the one or more missing data segments comprises determining a first missing RLC PDU and a second missing RLC PDU in the sequence of RLC PDUs, the first missing RLC PDU and the second missing RLC PDU spaced apart by at least a third RLC PDU of the one or more received RLC PDUs based on a first sequence number associated with the first missing RLC PDU, a second sequence number associated with the second missing RLC PDU, and a third sequence number of the third RLC PDU.

Aspect 14 includes the method of any of aspects 11-13, further comprising determining to include the data range in the RLC status report based on at least one of a quantity of missing RLC PDUs between the first missing RLC PDU and the second missing RLC PDU or the size of the UL grant.

Aspect 15 includes the method of any of aspects 11-14, wherein the transmitting the RLC status report comprises transmitting the RLC status report indicating the first sequence number of the first missing RLC PDU and a quantity of consecutive RLC PDUs from the first missing RLC PDU to the second missing RLC PDU in the sequence of RLC PDUs.

Aspect 16 includes the method of any of aspects 11-12, wherein the determining the one or more missing data segments comprises determining one or more non-consecutive missing byte segments in at least a first RLC PDU of the one or more received RLC PDUs, the one or more non-consecutive missing byte segments being less than all bytes in the first RLC PDU.

Aspect 17 includes the method of any of aspects 11-12 or 16, further comprising determining to include the data range in the RLC status report based on at least one of a quantity of the one or more non-consecutive missing byte segments or the size of the UL grant, the data range including at least the one or more non-consecutive missing byte segments.

Aspect 18 includes the method of any of aspects 11-12 or 16-17, wherein the transmitting the RLC status report comprises transmitting the RLC status report indicating a sequence number associated with the first RLC PDU.

Aspect 19 includes the method of any of aspects 11-12 or 16-18, further comprising generating the RLC status report, wherein the generating the RLC status report comprises assigning, in response to determining to include the data range in the RLC status report, the sequence number of the first RLC PDU to an acknowledgement sequence number (ACK SN) indication, wherein the transmitting the RLC status report further comprises transmitting the RLC status report including the ACK SN indication indicating the sequence number of the first RLC PDU.

Aspect 20 includes an apparatus comprising a processor coupled to a transceiver, wherein the processor and the transceiver are configured to perform the method of any one of aspects 1-10. The processor and the transceiver may correspond to the processor 802 and the transceiver 810 of FIG. 8, respectively.

Aspect 21 includes an apparatus comprising means for performing the method of any one of aspects 1-10. The means may include components, such as the processor 802, the memory 804, the RLC module 808, the MAC module 809, the transceiver 810, the modem 812, and the one or more antennas 816 of FIG. 8.

Aspect 22 includes a non-transitory computer readable medium including program code, which when executed by one or more processors, causes a wireless communication device to perform the method of any one of aspects 1-10.

Aspect 23 includes an apparatus comprising a processor coupled to a transceiver, wherein the processor and the transceiver are configured to perform the method of any one of aspects 11-19. The processor and the transceiver may correspond to the processor 802 and the transceiver 810 of FIG. 8, respectively.

Aspect 24 includes an apparatus comprising means for performing the method of any one of aspects 11-19. The means may include components, such as the processor 802, the memory 804, the RLC module 808, the MAC module 809, the transceiver 810, the modem 812, and the one or more antennas 816 of FIG. 8.

Aspect 25 includes a non-transitory computer readable medium including program code, which when executed by one or more processors, causes a wireless communication device to perform the method of any one of aspects 11-19.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a wireless communication device, comprising:
   receiving one or more radio link control (RLC) packet data units (PDUs) of a sequence of RLC PDUs;
   determining one or more missing data segments in the sequence of RLC PDUs based on the received one or more RLC PDUs;
   receiving an uplink (UL) grant;
   transmitting a RLC status report indicating that a data range in the sequence of RLC PDUs includes missing data based on the one or more missing data segments, wherein the data range includes at least one received data segment, and wherein the indication of the data range is based on a size of the UL grant;
   determining to include the data range in the RLC status report based on at least one of a quantity of the one or more non-consecutive missing byte segments or the size of the UL grant, the data range including at least the one or more non-consecutive missing byte segments; and
   wherein the determining the one or more missing data segments comprises:
   determining one or more non-consecutive missing byte segments in at least a first RLC PDU of the one or more received RLC PDUs, the one or more non-consecutive missing byte segments being less than all bytes in the first RLC PDU.

2. The method of claim 1, wherein the sequence of RLC PDUs is associated with a RLC receive window.

3. The method of claim 1, wherein the transmitting the RLC status report comprises:
   transmitting, in response to determining to include the data range in the RLC status report, the RLC status report indicating a sequence number associated with the first RLC PDU.

4. The method of claim 3, further comprising:
   generating the RLC status report, wherein the generating the RLC status report comprises:
      assigning, in response to determining to include the data range in the RLC status report, the sequence number of the first RLC PDU to an acknowledgement sequence number (ACK SN) indication,
   wherein the transmitting the RLC status report further comprises:
      transmitting the RLC status report including the ACK SN indication indicating the sequence number of the first RLC PDU.

5. A wireless communication device comprising:
   at least one memory;
   at least one transceiver; and
   at least one processor coupled to the at least one memory and the at least one transceiver, wherein the wireless communication device is configured to:
   receive one or more radio link control (RLC) packet data units (PDUs) of a sequence of RLC PDUs;
   determine one or more missing data segments in the sequence of RLC PDUs based on the received one or more RLC PDUs;
   receive an uplink (UL) grant;
   transmit a RLC status report indicating that a data range in the sequence of RLC PDUs includes missing data based on the one or more missing data segments, wherein the data range includes at least one received data segment, and wherein the indication of the data range being is on a size of the UL grant;
   determine to include the data range in the RLC status report based on at least one of a quantity of the one or more non-consecutive missing byte segments or the size of the UL grant, the data range including at least the one or more non-consecutive missing byte segments; and
   wherein the determine the one or more missing data segments comprises:
   determine one or more non-consecutive missing byte segments in at least a first RLC PDU of the one or more received RLC PDUs, the one or more non-consecutive missing byte segments being less than all bytes in the first RLC PDU.

6. The wireless communication device of claim 5, wherein the sequence of RLC PDUs is associated with a RLC receive window.

7. The wireless communication device of claim 5, wherein the transmitting the RLC status report comprises:
   transmitting, in response to determining to include the data range in the RLC status report, the RLC status report indicating a sequence number associated with the first RLC PDU.

8. The wireless communication device of claim 5, wherein the wireless communication device is further configured to:
   generate the RLC status report, wherein the generating the RLC status report comprises:
      assign, in response to determining to include the data range in the RLC status report, the sequence number of the first RLC PDU to an acknowledgement sequence number (ACK SN) indication,
   wherein the transmit the RLC status report further comprises:
      transmit the RLC status report including the ACK SN indication indicating the sequence number of the first RLC PDU.

9. A non-transitory computer-readable medium storing one or more instructions for wireless communication, the one or more instructions comprising one or more instructions that, when executed by one or more processors of a wireless communication device, cause the wireless communication device to:
   receive one or more radio link control (RLC) packet data units (PDUs) of a sequence of RLC PDUS;

determine one or more missing data segments in the sequence of RLC PDUs based on the received one or more RLC PDUs;

receive an uplink (UL) grant;

transmit a RLC status report indicating that a data range in the sequence of RLC PDUs includes missing data based on the one or more missing data segments, wherein the data range includes at least one received data segment, and wherein the indication of the data range is based on a size of the UL grant;

determine to include the data range in the RLC status report based on at least one of a quantity of the one or more non-consecutive missing byte segments or the size of the UL grant, the data range including at least the one or more non-consecutive missing byte segments; and wherein the determine the one or more missing data segments comprises:

determine one or more non-consecutive missing byte segments in at least a first RLC PDU of the one or more received RLC PDUs, the one or more non-consecutive missing byte segments being less than all bytes in the first RLC PDU.

10. The non-transitory computer-readable medium of claim 9, wherein the transmitting the RLC status report comprises:

transmitting, in response to determining to include the data range in the RLC status report, the RLC status report indicating a sequence number associated with the first RLC PDU.

11. The non-transitory computer-readable medium of claim 9, wherein the one or more instructions further cause the wireless communication device to:

generate the RLC status report, wherein the generating the RLC status report comprises:

assigning, in response to determining to include the data range in the RLC status report, the sequence number of the first RLC PDU to an acknowledgement sequence number (ACK SN) indication, wherein the transmit the RLC status report further comprises:

transmit the RLC status report including the ACK SN indication indicating the sequence number of the first RLC PDU.

* * * * *